(12) United States Patent
Griot et al.

(10) Patent No.: US 10,028,212 B2
(45) Date of Patent: Jul. 17, 2018

(54) TECHNIQUES FOR PROVISIONING CONFIGURATION INFORMATION BASED ON CELL CHARACTERISTICS

(71) Applicant: QUALCOMM Incorporated, San Diego, CA (US)

(72) Inventors: Miguel Griot, La Jolla, CA (US); Gavin Bernard Horn, La Jolla, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 14/492,961

(22) Filed: Sep. 22, 2014

(65) Prior Publication Data
US 2015/0148038 A1 May 28, 2015

Related U.S. Application Data

(60) Provisional application No. 61/907,891, filed on Nov. 22, 2013.

(51) Int. Cl.
*H04W 28/08* (2009.01)
*H04W 48/18* (2009.01)
(Continued)

(52) U.S. Cl.
CPC ............. *H04W 48/18* (2013.01); *H04W 8/18* (2013.01); *H04W 24/02* (2013.01);
(Continued)

(58) Field of Classification Search
CPC ...... H04W 48/18; H04W 8/183; H04W 48/16; H04W 8/18; H04W 48/20; H04W 24/02;
(Continued)

(56) References Cited

U.S. PATENT DOCUMENTS

| 8,917,702 | B2 * | 12/2014 | Wegmann | ......... H04W 36/0083 370/331 |
| 2011/0112416 | A1 * | 5/2011 | Myr | ..................... A61B 5/0006 600/509 |

(Continued)

OTHER PUBLICATIONS

ISA/EPO, International Search Report and Written Opinion of the International Searching Authority, Int'l App. No. PCT/US2014/056933, dated Feb. 2, 2015, European Patent Office, Rijswijk, NL 18 pgs.
(Continued)

*Primary Examiner* — Ted Wang
(74) *Attorney, Agent, or Firm* — Holland & Hart LLP

(57) ABSTRACT

Techniques are described for configuring wireless service for a user equipment (UE) in a wireless communications network in which the UE may be served over one or more of multiple available cells. Wireless service for the UE may be configured based on parameters associated with each of the multiple cells, such as, for example, a primary/secondary cell designation of a cell, whether the cell operates using a licensed or an unlicensed radio frequency spectrum band, a radio access technology associated with a cell, and/or an operating frequency band of a cell. Based on the parameters for each cell, one or more cell configurations for serving the UE may be provided. The cell configurations may identify, for example, a set of rules that control how much and/or what type of traffic is sent on different cells.

64 Claims, 14 Drawing Sheets

(51) Int. Cl.
*H04W 24/02* (2009.01)
*H04W 8/18* (2009.01)
*H04W 76/15* (2018.01)
*H04W 28/02* (2009.01)

(52) U.S. Cl.
CPC .... *H04W 28/0205* (2013.01); *H04W 28/0247* (2013.01); *H04W 28/0268* (2013.01); *H04W 28/08* (2013.01); *H04W 76/15* (2018.02)

(58) Field of Classification Search
CPC ........... H04W 28/0247; H04W 76/025; H04W 28/08; H04W 28/0268; H04W 28/0205
See application file for complete search history.

(56) References Cited

U.S. PATENT DOCUMENTS

| | | | |
|---|---|---|---|
| 2012/0238305 A1* | 9/2012 | Xiao | H04W 52/40 455/509 |
| 2012/0324100 A1 | 12/2012 | Tomici et al. | |
| 2013/0016696 A1 | 1/2013 | Adjakple et al. | |
| 2013/0183995 A1 | 7/2013 | Smith et al. | |
| 2014/0187243 A1* | 7/2014 | Rune | H04W 36/26 455/436 |
| 2015/0244429 A1* | 8/2015 | Zhang | H04B 7/024 370/329 |

OTHER PUBLICATIONS

IPEA/EPO, Second Written Opinion of the International Preliminary Examining Authority, Int'l App. No. PCT/US2014/056933, dated Nov. 4, 2015, European Patent Office, Munich, DE 16 pgs.

* cited by examiner

TECHNIQUES FOR PROVISIONING CONFIGURATION INFORMATION BASED ON CELL CHARACTERISTICS

CROSS REFERENCES

The present Application for Patent claims priority to U.S. Provisional Patent Application No. 61/907,891 by Griot et al., entitled "Techniques For Provisioning Configuration Information Based On Cell Characteristics," filed Nov. 22, 2013, assigned to the assignee hereof, and which is hereby incorporated by reference in its entirety.

FIELD OF THE DISCLOSURE

The present disclosure, for example, relates to wireless communication, and more specifically to techniques for determining provisioning configuration information for serving traffic over multiple cells in a wireless communication network.

DESCRIPTION OF RELATED ART

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of access points. The access points of a wireless wide area network (WWAN) may include a number of base stations, such as NodeBs (NBs) or evolved NodeBs (eNBs). The access points of a wireless local area network (WLAN) may include a number of WLAN access points, such as Wi-Fi nodes. Each access point may support communication for a number of user equipments (UEs) and may often communicate with multiple UEs at the same time. Similarly, each UE may communicate with a number of access points, and may sometimes communicate with multiple access points and/or access points employing different access technologies. An access point may communicate with a UE via downlink and uplink. The downlink (or forward link) refers to the communication link from the access point to the UE, and the uplink (or reverse link) refers to the communication link from the UE to the access point.

As WWANs become more heavily utilized, operators are seeking ways to increase capacity. One approach may include the use of WLANs to offload some of the traffic and/or signaling of a WWAN. WLANs (such as Wi-Fi networks) may offer attractive features because, unlike WWANs that operate in a licensed radio frequency spectrum band, Wi-Fi networks may operate in an unlicensed radio frequency spectrum band, and are thus available for use by various entities subject to established rules for providing fair access to the spectrum. In some deployments, various operators may wish to access the unlicensed radio frequency spectrum band for use in establishing a connection to a UE. In some cases, a wireless connection may be established using a licensed radio frequency spectrum band, and a second wireless connection may be established using unlicensed radio frequency spectrum band. The wireless connection using the licensed radio frequency spectrum band may be established using a first, or primary, cell, and the second wireless connection using the unlicensed radio frequency spectrum band may be established using a second, or secondary, cell. The first and second cells may or may not be collocated. Some operators may desire to provide different configurations for serving traffic over different cells.

SUMMARY

The present disclosure relates, for example, to one or more improved systems, methods, and/or devices for wireless communications, and more particularly, to configuring wireless service for a user equipment (UE) in a wireless communications network in which the UE may be served over one or more of multiple cells. Wireless service for the UE may be configured based on parameters associated with each of the multiple cells, such as, for example, a primary cell designation or secondary cell designation of a cell, whether the cell operates using a licensed, an unlicensed, or an authorized shared radio frequency spectrum band, a radio access technology associated with a cell, and/or an operating frequency band of a cell. Based on the parameters for each cell, one or more cell configurations for serving the UE may be determined. The cell configurations may identify, for example, a set of rules that control how much and/or what type of traffic is served on different cells, such as a primary cell having certain parameters and a secondary cell with one or more different parameters.

According to a first set of illustrative examples, a method for configuring wireless service for a user equipment (UE) in a wireless communications network may include identifying a first set of parameters associated with a first cell; identifying a second set of parameters associated with a second cell; and providing one or more cell configurations of at least one of the first cell and the second cell for serving the UE based on at least one of the first set of parameters and the second set of parameters.

In certain examples, each of the first set of parameters and the second set of parameters may include one or more of the following cell characteristics: a primary cell designation or secondary cell designation of a cell; a licensed radio frequency spectrum band or an unlicensed radio frequency spectrum band associated with a cell; a radio access technology associated with a cell; or an operating frequency band of a cell. In some examples, the one or more cell configurations may identify which of the first cell and the second cell is allowed to serve the UE. The one or more cell configurations may identify, for example, one or more of: a percentage of traffic volume to be served over the first cell and a percentage of traffic volume to be served over the second cell; a maximum amount of traffic volume to be served over the first cell or the second cell; a maximum bit rate to be served over the first cell or the second cell; a minimum bit rate to be served over the first cell or the second cell; an application type to be served over the first cell or the second cell; one or more bearers to be served over the first cell or the second cell; one or more service data flows to be served over the first cell or the second cell; one or more prioritization rules associated with the first cell or the second cell; a Quality of Service (QoS) requirement of traffic volume to be served by the first cell or the second cell; or an amount of air interface resources available to the first cell or the second cell.

In certain examples, the first set of parameters and the second set of parameters may be identified based at least in part on: a policy and charging rules function (PCRF); or subscription information associated with the UE. In some examples, providing the one or more cell configurations may include transmitting the one or more cell configurations to an access node. Such transmitting may occur, for example, during one or more of: a connection establishment procedure between the access node and the UE; a default bearer activation procedure between the access node and the UE; a dedicated bearer activation procedure between the access node and the UE; or a packet data protocol (PDP) context activation procedure between the access node and the UE. The one or more cell configurations, in certain examples, may be provided to the access node via control plane signaling. The one or more cell configurations, in some examples, may be provided: for the UE; for a bearer of the UE; for a service data flow (SDF); for a class of UE; or for all UEs to be served using one or more of the first cell or the second cell.

According to a second set of illustrative examples, a method for wireless communication at an access node in a wireless communications network may include determining one or more cell configurations for serving a user equipment (UE) using a first cell and a second cell of the access node, wherein the one or more cell configurations are based at least in part on a first set of parameters associated with the first cell and a second set of parameters associated with the second cell; and serving the UE based at least in part on the determined one or more cell configurations.

In certain examples, serving the UE may include serving a first portion of a traffic stream over the first cell; and serving a second portion of the traffic stream over the second cell. In certain examples, serving the UE may include determining whether to serve the UE over the first cell; and determining whether to serve the UE over the second cell. Such determining may include, for example, one or more of: instructing the UE to establish a connection with each of the first cell and the second cell; or instructing the UE to determine if access to the first cell or the second cell is available. The one or more cell configurations may include, for example, one or more of: a percentage of traffic volume to be served over the first cell and a percentage of traffic volume to be served over the second cell; a maximum amount of traffic volume to be served over the first cell or the second cell; a maximum bit rate to be served over the first cell or the second cell; a minimum bit rate to be served over the first cell or the second cell; an application type to be served over the first cell or the second cell; one or more bearers to be served over the first cell or the second cell; one or more service data flows to be served over the first cell or the second cell; one or more prioritization rules associated with the first cell or the second cell; a Quality of Service (QoS) requirement of traffic volume to be served by the first cell or the second cell; or an amount of air interface resources available to the first cell or the second cell.

In some examples, the method may also include receiving the one or more cell configurations, which may be received from a first network node during one or more of: a connection establishment procedure between the access node and the UE; a default bearer activation procedure between the access node and the UE; a dedicated bearer activation procedure between the access node and the UE; or a packet data protocol (PDP) context activation procedure between the access node and the UE. In some examples, the one or more cell configurations may be received from a second network node. According to certain examples, the one or more cell configurations may be provided: for the UE; for a bearer of the UE; for a service data flow (SDF); for a class of UE; or for all UEs to be served using one or more of the first cell or the second cell.

According to a third set of illustrative examples, an apparatus for configuring wireless service for a user equipment (UE) in a wireless communications network may include means for identifying a first set of parameters associated with a first cell; means for determining a second set of parameters associated with a second cell; and means for providing one or more cell configurations of at least one of the first cell and the second cell for serving the UE based on at least one of the first set of parameters and the second set of parameters.

In certain examples, the apparatus may include means for implementing one or more aspects of first set of illustrative examples described above.

According to a fourth set of illustrative examples, an apparatus for wireless communication at an access node in a wireless communications network may include means for determining one or more cell configurations for serving a user equipment (UE) using a first cell and a second cell of the access node, wherein the one or more cell configurations are based at least in part on a first set of parameters associated with the first cell and a second set of parameters associated with the second cell; and means for serving the UE based at least in part on the determined one or more cell configurations.

In certain examples, the apparatus may include means for implementing one or more aspects of second set of illustrative examples described above.

According to a fifth set of illustrative examples, an apparatus for configuring wireless service for a user equipment (UE) in a wireless communications network; may include a processor; memory in electronic communication with the processor; and instructions stored in the memory, the instructions being executable by the processor to cause the apparatus to: identify a first set of parameters associated with a first cell; identify a second set of parameters associated with a second cell; and provide one or more cell configurations of at least one of the first cell and the second cell for serving the UE based on at least one of the first set of parameters and the second set of parameters.

In certain examples, the processor may be configured to execute instructions stored on the memory to implement one or more aspects of first set of illustrative examples described above.

According to a sixth set of illustrative examples, an apparatus for wireless communication at an access node in a wireless communications network may include a processor; memory in electronic communication with the processor; and instructions stored in the memory, the instructions being executable by the processor to cause the apparatus to: determine one or more cell configurations for serving a user equipment (UE) using a first cell and a second cell of the access node, wherein the one or more cell configurations are based at least in part on a first set of parameters associated with the first cell and a second set of parameters associated with the second cell; and serve the UE based at least in part on the determined one or more cell configurations.

In certain examples, the processor may be configured to execute instructions stored on the memory to implement one or more aspects of second set of illustrative examples described above.

According to a seventh set of illustrative examples, a computer program product for configuring wireless service for a user equipment (UE) in a wireless communications network may include a non-transitory computer-readable medium storing computer-executable code, the code executable by a processor to: identify a first set of parameters associated with a first cell; identify a second set of parameters associated with a second cell; and provide one or more cell configurations of at least one of the first cell and the second cell for serving the UE based on at least one of the first set of parameters and the second set of parameters.

In certain examples, the code may be configured to implement one or more aspects of first set of illustrative examples described above.

According to an eighth set of illustrative examples, a computer program product for wireless communication at an access node in a wireless communications network may include a non-transitory computer-readable medium storing computer-executable code, the code executable by a processor to: determine one or more cell configurations for serving a user equipment (UE) using a first cell and a second cell of the access node, wherein the one or more cell configurations are based at least in part on a first set of parameters associated with the first cell and a second set of parameters associated with the second cell; and serve the UE based at least in part on the determined one or more cell configurations.

In certain examples, the code may be configured to cause the wireless communications apparatus to implement one or more aspects of second set of illustrative examples described above.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
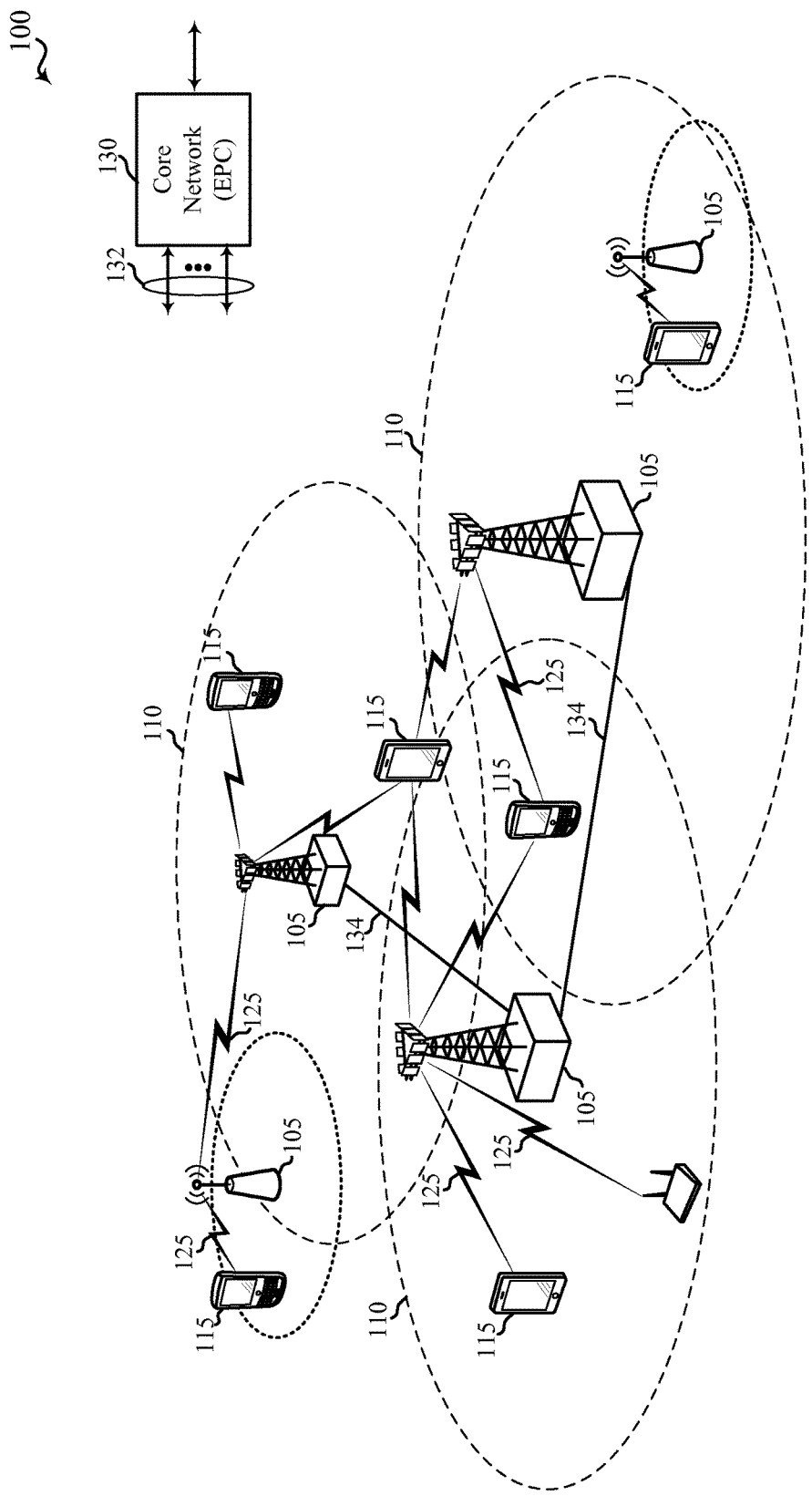
FIG. 1 shows a block diagram conceptually illustrating an example of a wireless communications system, in accordance with aspects of the present disclosure.

Techniques are described in which different cells may be used in communications with a user equipment (UE). For example, licensed, unlicensed and authorized shared access (ASA) radio frequency spectrum bands may be used for WWAN communications (e.g., Long Term Evolution (LTE) communications) with a UE. LTE communications over an unlicensed radio frequency spectrum band may be referred to herein as extending LTE communications in an unlicensed radio frequency spectrum band. LTE communications over a licensed radio frequency spectrum band may be referred to herein as LTE communications. LTE communications over an authorized shared access (ASA) radio frequency spectrum band may be referred to herein as LTE authorized shared access (LTE-ASA) communications.

With increasing data traffic in WWANs, offloading at least some data traffic to unlicensed radio frequency spectrum band may provide WWAN operators with opportunities for enhanced data transmission capacity. According to various aspects of the present disclosure, a UE provided with network access by an operator may be served by one or more cells that may operate using licensed, unlicensed or authorized shared radio frequency spectrum band. Traffic served by different cells or different RATs may be charged for differently by the operator. For example, traffic served over unlicensed radio frequency spectrum band may be charged at a lower rate than traffic served over licensed radio frequency spectrum band. In another example, traffic served over authorized shared access radio frequency spectrum band may be charged at a lower rate than traffic served over licensed radio frequency spectrum band. According to disclosed aspects, configurations of different cells for serving one or more UEs may be determined according to parameters associated with the different cells or RATs and a set of rules for serving the one or more UEs. For example, one or more network nodes may determine a set of rules that may control how much traffic is serviced using a first (e.g., a primary cell) having one or more parameters compared to a second (e.g., a secondary cell) having one or more different parameters. In another example, one or more access nodes may be configured with a set of rules that control how much traffic is serviced using a first (e.g., a primary cell) with certain characteristics compared to a second (e.g., a secondary cell) with different characteristics.

For example, a set of rules may be used to determine how much traffic is served over a first cell (e.g., primary cell) on licensed radio frequency spectrum band and/or a second cell (e.g., secondary cell) over unlicensed or authorized shared radio frequency spectrum band when both primary and secondary cells are available to serve a UE. Additionally or alternatively, a set of rules may be used to determine how much traffic is served over a first cell (e.g., primary cell) using a first RAT and/or a second cell (e.g., secondary cell) using a second RAT. Based on available radio frequency spectrum bands and available RATs, one or more wireless connections may be established with a UE using a first cell and a second cell, which may have different cell parameters. For example, the first cell may operate using a licensed radio frequency spectrum band and the second cell may operate using an unlicensed or authorized shared radio frequency spectrum band. In another example, the first cell may operate using a WWAN (e.g., LTE) RAT and the second cell may operate using a WLAN (e.g., Wi-Fi) RAT. The cell parameters of the first and second cells may be, but are not limited to, one or a combination of multiple of: primary/secondary cells or primary/secondary sets of cells; frequency bands at which different cells operate; cells that operate using licensed/unlicensed radio frequency spectrum band; cells that operate using licensed/authorized shared radio frequency spectrum band, or RATs used by the cells (e.g., E-UTRAN, LTE in a contention-based radio frequency spectrum band, WLAN, GERAN, UTRAN, etc.). One or more different cells may be associated with a same access node, such as an eNodeB, or with different access nodes, such as an eNodeB and an access point (AP).

A cell configuration for one or more cells to serve one or more UEs, based on cell parameters, may be separate for uplink and downlink transmissions, and may include, for example, one or more of: a percentage of data served by a first cell having first cell parameters and a second cell having second cell parameters, a maximum amount of data to be transmitted over cell based at least in part on one or more cell parameters (including no data), a maximum bit rate or a minimum bit rate that may be served over a particular cell, applications or application types served over a cell, bearer or bearer types served over a cell, service data flows (SDFs) served over a cell, prioritization rules for transmission over cells with identified cell parameters (e.g., transmit over first cell up to certain rate, rest of traffic (if any) over second cell), types of data served by a cell (e.g., based on QoS requirements), or an amount of air interface resources available on each cell, to name a few examples.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

As used in the present description and the appended claims, the term "wireless wide area network" or "WWAN" refers to a cellular wireless network. Examples of WWANs include, for example, LTE networks, UMTS networks, CDMA2000 networks, GSM/EDGE networks, 1x/EV-DO networks, and the like. In certain examples, a WWAN may be referred to as a "radio access network."

As used in the present description and the appended claims, the term "wireless local area network" or "WLAN" refers to a non-cellular wireless network. Examples of WLANs include, for example, wireless networks conforming to the IEEE 802.11 ("Wi-Fi") family of standards that may transmit using unlicensed radio frequency spectrum band in the 5 GHz band according to established rules for access to the unlicensed radio frequency spectrum band.

FIG. 1 shows a block diagram conceptually illustrating an example of a wireless communications system 100, in accordance with aspects of the present disclosure. The wireless communications system 100 includes a plurality of access points (e.g., base stations, eNBs, or WLAN access points) 105, a number of user equipment (UEs) 115, and a core network 130. Access points 105 may also be referred to as access nodes, as used herein. Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 (also referred to as an Evolved Packet Core (EPC)) through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In examples, the wireless communications system 100 is an LTE/LTE-A communications system (or network) that supports one or more LTE in a contention-based radio frequency spectrum band modes of operation or deployment scenarios, and may employ coordinated contention-based channel access procedures among access points 105 and UEs 115. In examples, the wireless communications system 100 may support wireless communications using an unlicensed radio frequency spectrum band and an access technology different from LTE in unlicensed, or licensed radio frequency spectrum band and an access technology different from LTE/LTE-A. In LTE/LTE-A network communication systems, the terms evolved Node B (eNodeB or eNB) may be generally used to describe the access points 105. The wireless communications system 100 may be a Heterogeneous LTE/LTE-A/LTE in contention-based radio frequency spectrum band network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A pico cell would generally cover a relatively smaller geographic area and may allow unrestricted access by UEs 115 with service subscriptions with the network provider. A femto cell would also generally cover a relatively small geographic area (e.g., a home) and, in addition to unrestricted access, may also provide restricted access by UEs 115 having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs or other access points 105 via a backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The downlink transmissions may be made using a licensed radio frequency spectrum band (e.g., LTE), an unlicensed radio frequency spectrum band (e.g., LTE in contention-based radio frequency spectrum band), an authorized shared radio frequency spectrum band (e.g., LTE-A) or both (LTE in licensed radio frequency spectrum band/LTE in unlicensed radio frequency spectrum band or LTE/LTE-A). Similarly, the uplink transmissions may be made using a licensed radio frequency spectrum band (e.g., LTE), an unlicensed radio frequency spectrum band (e.g., LTE in contention-based radio frequency spectrum band), an authorized shared radio frequency spectrum band (e.g., LTE-A) or both (LTE in licensed radio frequency spectrum band/LTE in contention-based radio frequency spectrum band or LTE/LTE-A).

In some examples of the wireless communications system 100, various deployment scenarios for LTE in contention-based radio frequency spectrum band may be supported including a supplemental downlink mode in which LTE downlink capacity in a licensed radio frequency spectrum band may be offloaded to an unlicensed radio frequency spectrum band, a carrier aggregation mode in which both LTE downlink and uplink capacity may be offloaded from a licensed radio frequency spectrum band to an unlicensed radio frequency spectrum band, and a standalone mode in which LTE downlink and uplink communications between a base station (e.g., eNB) and a UE may take place in an unlicensed radio frequency spectrum band. Each of the different modes may operate according to frequency division duplexing (FDD) or time division duplexing (TDD). OFDMA communications signals may be used in the communication links 125 for LTE downlink transmissions in an unlicensed and/or a licensed radio frequency spectrum band, while SC-FDMA communications signals may be used in the communication links 125 for LTE uplink transmissions in an unlicensed and/or a licensed radio frequency spectrum band. Transmissions using the unlicensed radio frequency spectrum band may be carried using one or more carrier frequencies in a frequency band. A frequency band, for example, may be divided into multiple carrier frequencies, and each carrier frequency may have the same bandwidth or different bandwidth. For example, each carrier frequency may occupy 20 MHz of a 5 GHz frequency band.

In some examples, as mentioned above, an operator seeking to transmit using licensed, unlicensed, and/or authorized shared radio frequency spectrum band, and/or using different radio access technologies (e.g., LTE and WLAN) may determine cell configurations that may be used to establish connections with a UE 115 and serve all or a portion of a traffic stream to the UE 115. In some deployments, a UE 115 may be configured to access two different cells at once, such as a primary cell and a secondary cell, with traffic served by the different cells having different cell parameters. According to various examples, traffic served over different cells may be determined by an access point 105, and/or one or more network nodes in core network 130 based at least in part on the different cell parameters associated with the different cells. The cell parameters of the different cells may be, but are not limited to, one or a combination of: primary/secondary cells or primary/secondary sets of cells; frequency bands at which different cells operate; cells that operate using licensed/unlicensed radio frequency spectrum band; cell that operate using licensed/authorized shared radio frequency spectrum band, or a RAT used by the cells (e.g., E-UTRAN, LTE in contention-based radio frequency spectrum band, WLAN, GERAN, UTRAN, etc.). In some examples, one or more cell configurations may be provided for the UE 115, for a radio bearer of the UE 115, for a service data flow (SDF) to the UE 115, based on a class of the UE 115, or for all UEs to be served using the different cells.

Figure 2:
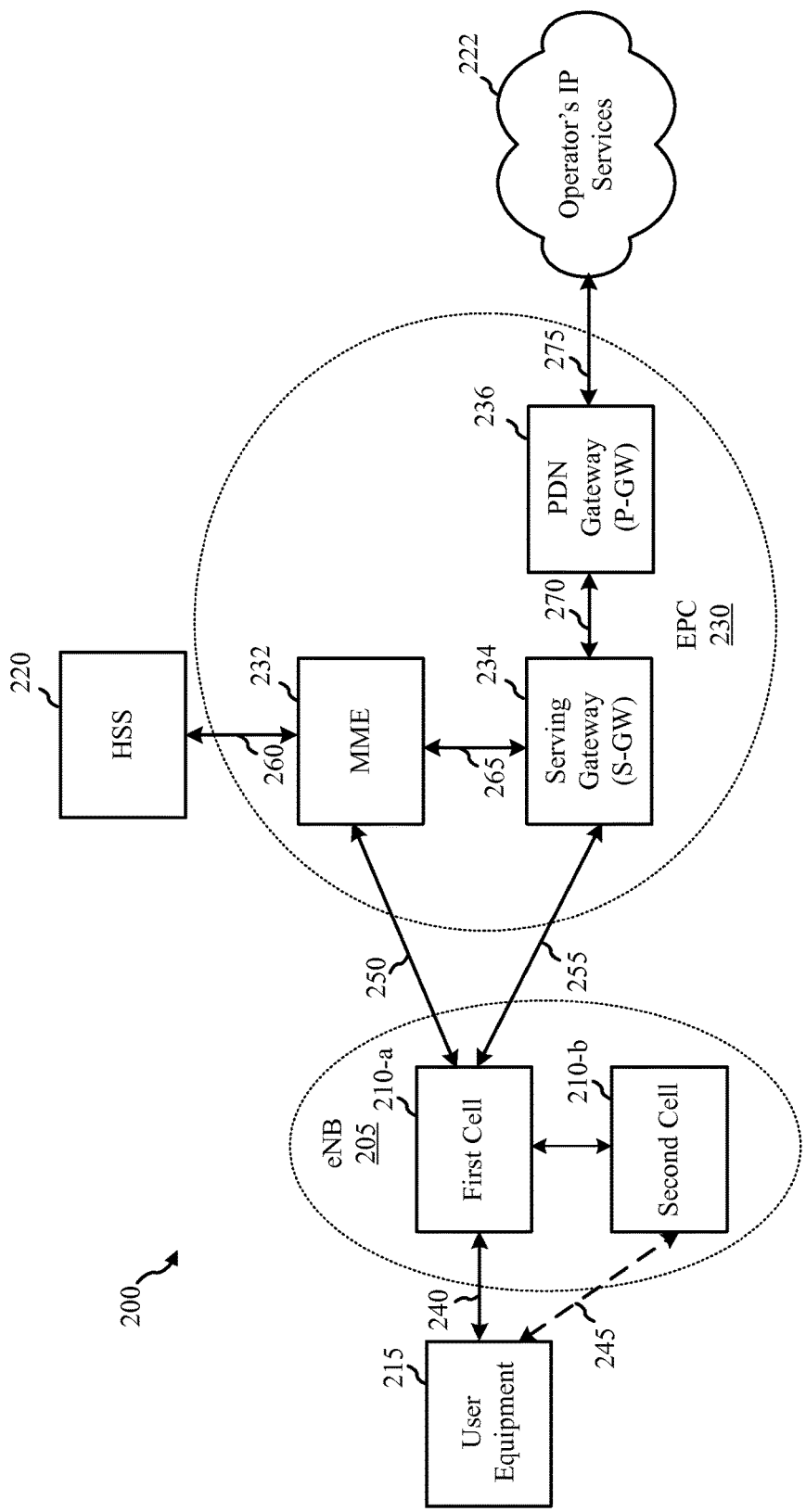
FIG. 2 shows a diagram illustrating an LTE/LTE-A/LTE in contention-based radio frequency spectrum band/WLAN network architecture that may determine cell configuration for serving one or more UEs over one or more cells, in accordance with various aspects of the present disclosure.

FIG. 2 shows a diagram illustrating an LTE/LTE-A/LTE in contention-based radio frequency spectrum band/WLAN network architecture 200 that may determine cell configuration for serving one or more UEs over one or more cells in accordance with various aspects of the present disclosure. The LTE/LTE-A/LTE in contention-based radio frequency spectrum band/WLAN network architecture 200 may include one or more UEs 215, an eNB 205 which may include a first cell 210-a and a second cell 210-b, an Evolved Packet Core (EPC) 230, a Home Subscriber Server (HSS) 220, and an Operator's IP Services 222. The network architecture 200 may interconnect with other access networks, but for simplicity those entities/interfaces are not shown. As shown, the network 200 provides packet-switched services, however, as those skilled in the art will readily appreciate, the various concepts presented throughout this disclosure may be extended to networks providing circuit-switched services.

The eNB 205 may include first cell 210-a and second cell 210-b. In some examples, each of the first cell 210-a and second cell 210-b may be access points connected by an X2 interface. In some examples, the first cell 210-a and second cell 210-b may operate according to different RATs and be collocated at a same physical location or non-collocated at different locations. UE 215 may be configured for access to the first cell 210-a and second cell 210-b. In some examples, the first cell 210-a and second cell 210-b may be collocated at eNB 205, and the first cell 210-a may provide LTE access in licensed radio frequency spectrum band, and the second cell 210-b may provide LTE access in contention-based radio frequency spectrum band. In other examples, the first cell 210-a may provide WWAN RAT access and the second cell may provide WLAN RAT access. In further examples, the first cell 210-a may provide LTE access and the second cell 210-b may provide LTE Authorized Shared Access (ASA). LTE ASA, used in some examples, may allow different operators to access the underutilized spectrum on a shared basis without interfering with incumbent spectrum holders. While some specific examples are listed here, it will be readily understood that other cell parameters may be used in various examples, such as frequency bands at which different cells 210 operate; cells 210 that operate using licensed/unlicensed/ASA radio frequency spectrum band; or RATs used by the cells 210 (e.g., E-UTRAN, LTE in contention-based radio frequency spectrum band, WLAN, GERAN, UTRAN, etc.).

As mentioned above, in some examples operators may desire to configure the different cells 210 serving the UE 215, based on parameters of each cell 210 and/or based on traffic to be served to the UE 215. For example, once a certain data cap over licensed radio frequency spectrum band is achieved, a cell 210 (e.g., first cell 210-a) serving UE 215 using licensed radio frequency spectrum band may be configured to discontinue serving the UE 215, while another cell (e.g., second cell 210-b) that may serve UE 215 using unlicensed radio frequency spectrum band may continue to serve the UE 215. In some examples, the existence of the second cell 210-b may be transparent to the EPC 230, and all traffic served by the first cell 210-a and second cell 210-b may be exchanged on a single connection 255, such as a S1-U interface for example, with the EPC 230.

The first cell 210-a may provide user and control plane protocol terminations toward the UE 215. The first cell 210-a may provide an access point to the EPC 230 for the UE 215, and may provide a first wireless connection 240 with the UE 215. The first cell 210-a may be connected by an S1-MME interface 250 to one or more Mobility Management Entities (MMEs) 232 of the EPC 230. Additionally or alternatively, the first cell 210-a may be connected by an S1-U interface 255 to one or more Serving Gateways 234 of the EPC 230. The MME 232 may be coupled with the S-GW 234 via interface 265, which may be an S11 interface. The S-GW 234 may be coupled with one or more Packet Data Network (PDN) Gateways (P-GWs) 236 via interface 270, which may be an S5 interface. The MME 232, among other functions, may provide bearer and connection management, and may verify UE 215 credentials with HSS 220 via interface 260, which may be a S6a interface. The P-GW 236 may provide UE IP address allocation as well as other functions. The P-GW 236 may be connected to the Operator's IP Services 222 via interface 275, which may be a SGi interface. The Operator's IP Services 222 may include, for example, the Internet, an Intranet, an IP Multimedia Subsystem (IMS), and a Packet-Switched (PS) Streaming Service (PSS).

As indicated above, in some examples operators may desire to configure the different cells 210 serving UE 215 based on, at least in part, parameters of the cells. In some examples, a Policy and Charging Enforcement Function (PCEF) in P-GW 236, may be configured to enforce different policies for bearers established for the UE 215 depending on whether a cell 210 with a certain cell parameter (e.g. unlicensed radio frequency spectrum band) is available or not. For example, the P-GW 236 may decide whether to deactivate the bearer or block all subsequent downlink/uplink traffic served over a first cell once a certain data cap over the first cell using licensed radio frequency spectrum band is reached, based at least in part on whether UE 215 is connected to a cell 210 that may use LTE in contention-based radio frequency spectrum band or authorized shared radio frequency spectrum band and/or different RATs.

In the event that the UE 215 is connected to a cell 210 that may use LTE in contention-based radio frequency spectrum band or authorized shared radio frequency spectrum band or different RATs, the P-GW 236 may allow traffic to continue to UE 215. For example, the P-GW 236 may provide one or more cell configurations to first cell 210-*a* and second cell 210-*b* that instruct that traffic is served over unlicensed or authorized shared radio frequency spectrum band and/or different RATs. In some examples, a Policy and Charging Rules Function (PCRF) may provide cell configurations that may be based at least in part on whether a cell 210 having one or more cell parameters (e.g. LTE in contention-based radio frequency spectrum band) is available for serving the UE 215. The PCRF and PCEF are related functional entities, which may include policy control decision making and flow based charging control functionalities. PCRF may provide network control relating to the service data flow detection, QoS, and flow based charging controlling to the PCEF, whereas PCEF may provide user traffic handling and QoS at the P-GW 236. The PCEF may also provide service data flow detection, counting, and online and offline charging interactions.

According to some examples, P-GW 236 may determine the configuration for cells 210 based at least in part on each bearer served by the cells 210, for example, as part of bearer activation. Additionally or alternatively, the MME 232 may determine the configuration for cells 210 based at least in part on each UE 215 served by the cells, for example, as part of a connection establishment procedure. In still further additional or alternative examples, an Operations Administration and Maintenance (OAM) function, which may be distributed over multiple nodes of the EPC 230, may determine the configuration for cells 210 per eNB 205, based on a Radio Access Network (RAN) deployment, and eNB 205 may be configured to serve UEs 215 based on the configuration provided by the OAM function.

Figure 3:
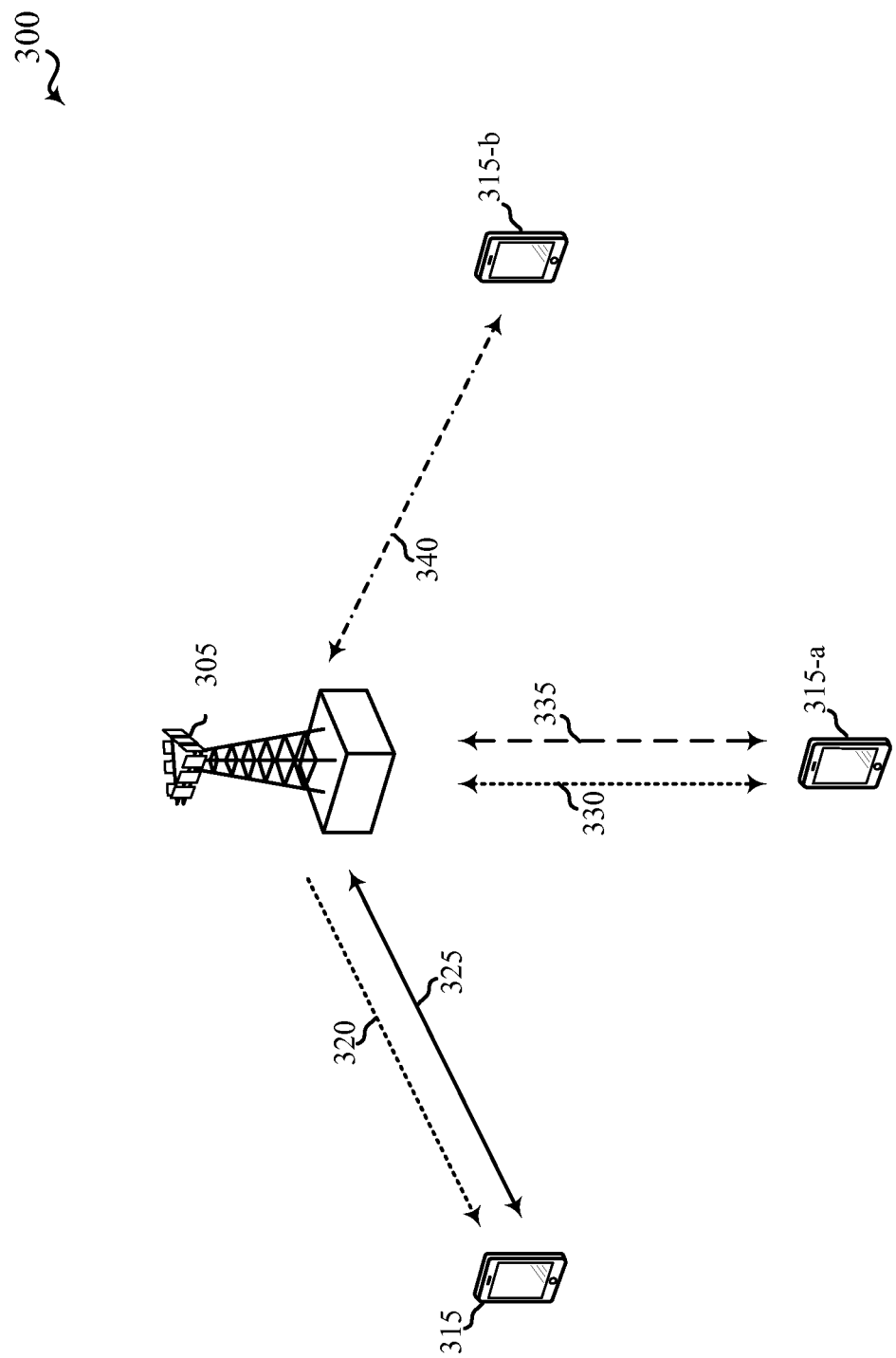
FIG. 3 is a block diagram conceptually illustrating examples of deployment scenarios for using LTE in an unlicensed radio frequency spectrum band, in accordance with aspects of the present disclosure.

FIG. 3 is a block diagram conceptually illustrating examples of deployment scenarios for using LTE in an unlicensed radio frequency spectrum band in accordance with aspects of the present disclosure. A wireless communications system 300 illustrates examples of a supplemental downlink mode, a carrier aggregation mode, and a standalone mode, for between an eNB 305 and UEs 315 in an LTE network that supports LTE in contention-based radio frequency spectrum band. The wireless communications system 300 may be an example of portions of the wireless communications systems 100 and/or 200 described with reference to FIGS. 1 and/or 2. Moreover, the eNB 305 may be an example of one of the access points and/or eNBs 105 and/or 205 of FIGS. 1 and/or 2, while the UEs 315 may be examples of the UEs 115 and/or 215 described with reference to FIGS. 1 and/or 2.

In the example of a supplemental downlink (SDL) mode in wireless communications system 300, using a first cell, the eNB 305 may transmit OFDMA communications signals to the UE 315 using a bidirectional link 325 and may receive SC-FDMA communications signals from that UE 315 using the bidirectional link 325. The bidirectional link 325 may be associated with a frequency in a licensed radio frequency spectrum band. At the same time, the eNB 305 may transmit OFDMA communications signals to a UE 315 using downlink 320 from a second cell of eNB 305. In the example of FIG. 3, downlink 320 may be associated with a frequency in an unlicensed radio frequency spectrum band. The downlink 320 in the unlicensed radio frequency spectrum band and the bidirectional link 325 in the licensed radio frequency spectrum band may operate concurrently. The downlink 320 may provide a downlink capacity offload for the eNB 305. In some examples, the downlink 320 may be used for unicast services (e.g., addressed to one UE) or for multicast services (e.g., addressed to several UEs). This scenario may occur with any service provider (e.g., a traditional mobile network operator or MNO) that uses a licensed radio frequency spectrum band and needs to relieve some of the traffic and/or signaling congestion. As mentioned above, the service provider may configure one or more cells to provide service to UE 315 based on cell parameters, and eNB 305 may be configured to provide certain traffic streams, or portions of traffic streams, to UE 315 in SDL mode based on such a configuration.

In one example of a carrier aggregation (CA) mode in wireless communications system 300, a first cell associated with the eNB 305 may transmit OFDMA communications signals to UE 315-*a* using a bidirectional link 335 and may receive SC-FDMA communications signals from the same UE 315-*a* using the bidirectional link 335. The bidirectional link 335 may be associated with a frequency in a licensed radio frequency spectrum band. Concurrently, a second cell associated with the eNB 305 may transmit OFDMA communications signals to a UE 315-*a* using a bidirectional link 330 and may receive SC-FDMA communications signals from the same UE 315-*a* using the bidirectional link 330. In the example of FIG. 3, bidirectional link 330 may be associated with a frequency in an unlicensed radio frequency spectrum band. The bidirectional link 330 may provide a downlink and uplink capacity offload for the eNB 305. Like the supplemental downlink mode described above, this scenario may occur with any service provider (e.g., a mobile network operator (MNO)) that uses a licensed radio frequency spectrum band needs to relieve some of the traffic and/or signaling congestion. As mentioned above, the service provider may configure one or more cells to provide service to UE 315-*a* based on cell parameters, and eNB 305 may be configured to provide certain traffic streams, or portions of traffic streams, to UE 315-*a* using CA mode based on such a configuration.

In an example of a standalone (SA) mode in wireless communications system 300, the eNB 305 may transmit OFDMA communications signals to a UE 315-*b* using a bidirectional link 340 and may receive SC-FDMA communications signals from the same UE 315-*b* using the bidirectional link 340 which may be associated with a frequency in an unlicensed radio frequency spectrum band. The bidirectional link 340 may provide a downlink and uplink capacity offload for the eNB 305. This example and those provided above are presented for illustrative purposes and there may be other similar modes of operation or deployment scenarios that combine LTE in licensed radio frequency spectrum band and LTE in contention-based radio frequency spectrum band for capacity offload. As mentioned above, the service provider may configure one or more cells to provide service to UE 315-*b* based on cell parameters, and eNB 305 may be configured to provide certain traffic streams, or portions of traffic streams, to UE 315-*b* using SA mode based on such a configuration.

As described above, a service provider that may benefit from the capacity offload offered by using an unlicensed radio frequency spectrum band may be a traditional MNO with a licensed radio frequency spectrum band. For these service providers, an operational configuration may include a bootstrapped mode (e.g., supplemental downlink, carrier aggregation) that uses a primary component carrier (PCC)

on the licensed radio frequency spectrum band and a secondary component carrier (SCC) on the unlicensed radio frequency spectrum band.

In the SDL mode, control for LTE in contention-based radio frequency spectrum band may be transported over the LTE uplink (e.g., uplink portion of the bidirectional link 325) in the licensed radio frequency spectrum band. One of the reasons to provide downlink capacity offload is because data demand may be largely driven by downlink consumption. Moreover, in this mode, there may be reduced regulatory impact since the UE 315 is not transmitting in the unlicensed radio frequency spectrum band. In the CA mode, data and signaling data (e.g., RRC data, NAS signaling data, and control channel physical signaling traffic) may be communicated in LTE (e.g., bidirectional link 335) using licensed radio frequency spectrum band while data may be communicated using LTE in contention-based radio frequency spectrum band (e.g., bidirectional link 330). The carrier aggregation mechanisms supported when using LTE in contention-based radio frequency spectrum band may fall under a hybrid frequency division duplexing-time division duplexing (FDD-TDD) carrier aggregation or a TDD-TDD carrier aggregation with different symmetry across component carriers.

Figure 4:
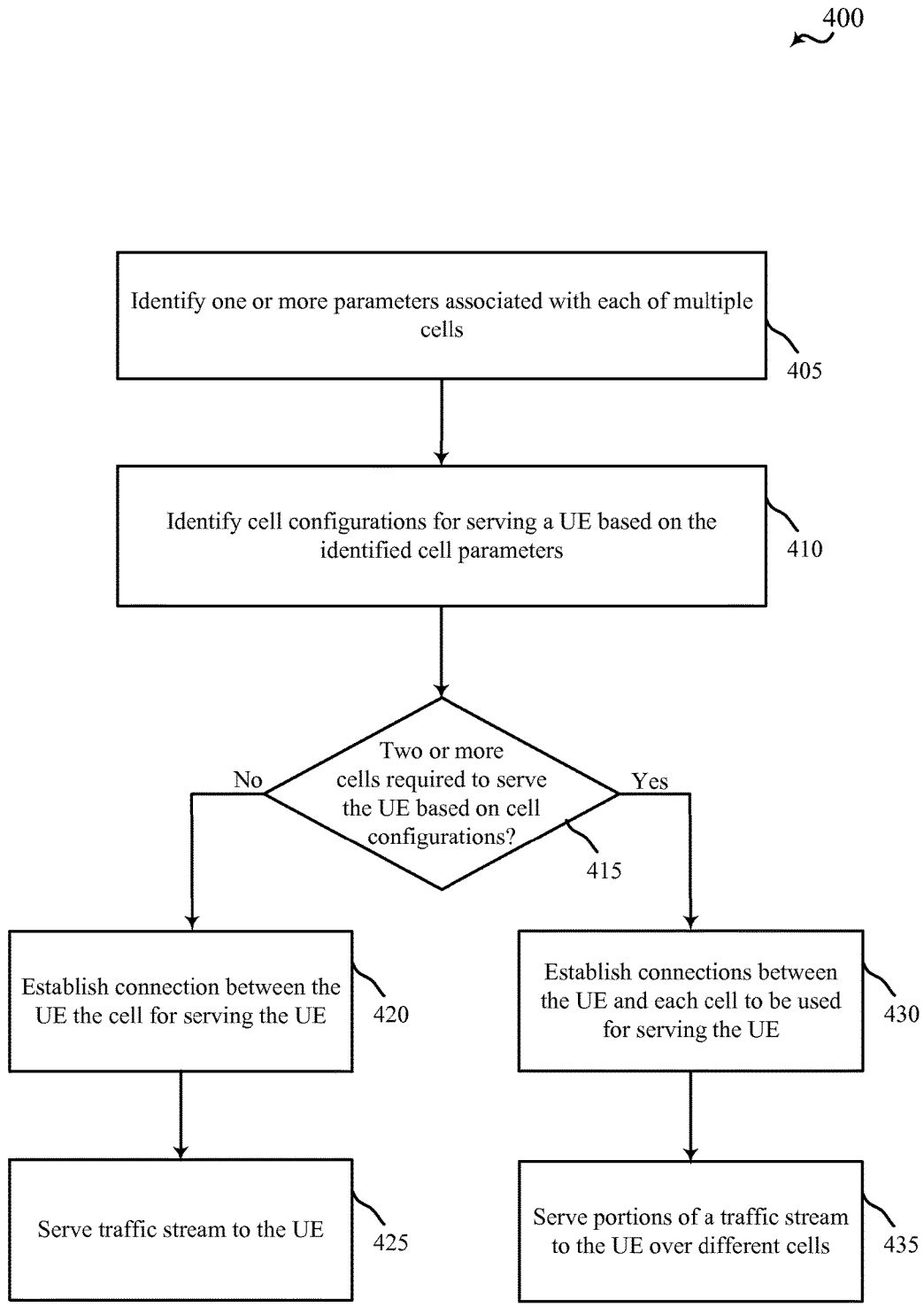
FIG. 4 is a flowchart conceptually illustrating an example of a method of cell configuration and service of traffic to one or more UEs, in accordance with various aspects of the present disclosure.

As discussed, above, cell configuration may be determined based on one or more of various cell parameters. FIG. 4 is a flowchart conceptually illustrating an example of a method 400 of cell configuration and service of traffic to one or more UEs, in accordance with various aspects of the present disclosure. Method 400 is described with reference to ones of the access nodes and/or eNBs 105, 205 and/or 305 and/or aspects of the core network 130, EPC 230 (e.g., S-GW 234 and/or P-GW 236) described with reference to FIGS. 1, 2 and/or 3. In examples, an access node or core network element may execute one or more sets of codes to control the functional elements of the device to perform the functions described below. At block 405, one or more parameters associated with each of multiple cells are identified. The parameters may include, for example, one or a combination of multiple of: primary/secondary cells or primary/secondary sets of cells; frequency bands at which different cells operate; cells that operate using licensed/unlicensed radio frequency spectrum band; cells that operate using licensed/authorized shared radio frequency spectrum band, or a RAT used by the cells (e.g., E-UTRAN, LTE in contention-based radio frequency spectrum band, WLAN, GERAN, UTRAN, etc.).

At block 410, one or more cell configurations are identified for serving a UE based on the identified cell parameters. A cell configuration for one or more cells to serve one or more UEs, based on cell parameters, may be separate for uplink and downlink transmissions, and may include, for example, one or more of: a percentage of data served by a first cell having first cell parameters and a second cell having second cell parameters, a maximum amount of data to be transmitted over a cell based at least in part on one or more cell parameters (including no data), a maximum bit rate or a minimum bit rate that may be served over a cell, applications or application types served over a cell, bearer or bearer types served over a cell, service data flows (SDFs) served over a cell, prioritization rules for transmission over cells with identified cell parameters (e.g., transmit over first cell up to certain rate, rest of traffic (if any) over cell two), a type of data served by a cell (e.g., based on QoS requirements), or an amount of air interface resources available on each cell, to name a few examples.

At block 415, it is determined whether two or more cells are required to serve the UE based on the identified cell configurations. If two or more cells are not required to serve the UE, a connection is established between the UE the cell for serving the UE, as indicated at block 420. At block 430, a traffic stream is served to the UE. If, at block 415, it is determined that two or more cells are required to serve the UE based on the identified cell configurations, connections are established between the UE and each cell to be used for serving the UE, as indicated at block 430. At block 435, different portions of a traffic stream are served to the UE over the different cells based at least in part on the identified cell configurations.

As mentioned above, in some examples a P-GW, such as P-GW 236 of FIG. 2, for example, may provide a configuration per bearer based on one or more cell parameters of a serving cell, such as a cell 210-*a* and/or cell 210-*b* of FIG. 2, and/or cells associated with access points and/or eNBs 105, 205, and/or 305 of FIGS. 1, 2, and/or 3, for example. The P-GW may provide such configuration(s) per evolved packet system (EPS) bearer. In some examples, the P-GW may provide such configuration(s) per service data flow (SDF). According to some examples, the P-GW may provide configuration(s) during a default EPS bearer activation and/or modification. In another example, the P-GW may provide configuration(s) during a dedicated EPS bearer activation and/or modification.

Figure 5:
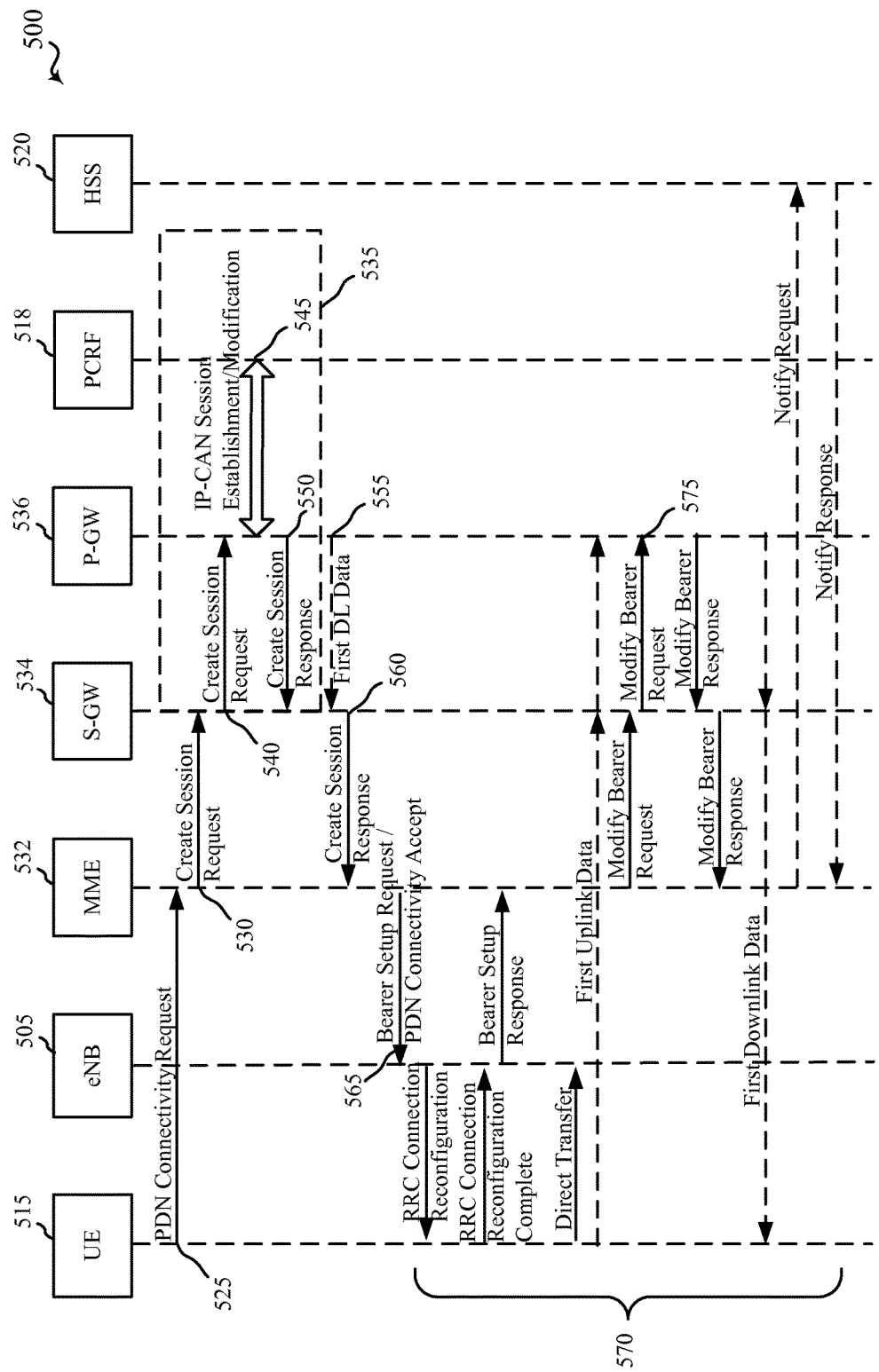
FIG. 5 is a flow diagram illustrating exemplary operations for cell configuration during default EPS bearer activation, in accordance with aspects of the present disclosure.

FIG. 5 is a flow diagram 500 illustrating exemplary operations for cell configuration during default EPS bearer activation, in accordance with aspects of the present disclosure. A default bearer activation procedure may be activated by UE 515 via a PDN Connectivity Request 525 to MME 532. Such a PDN connectivity request may either standalone or piggybacked in attach request message during attach procedure. The UE 515 may be an example of UEs 115, 215 and/or 315 of FIGS. 1, 2 and/or 3, for example. The MME may be an example of MME 232 of FIG. 2, for example.

The MME 532 forwards a create session request 530 to S-GW 534, which may be an example of S-GW 234 of FIG. 2, for example. One or more cell configurations may then be determined at operations 535. The S-GW 534 forwards create session request 540 to P-GW 536, which may be an example of P-GW 236 of FIG. 2, for example. An Internet Protocol Connectivity Access Network (IP-CAN) session 545 is established, during which P-GW 536 may receive from PCRF 518 one or more some cell parameter specific policies, if available, for the default bearer. Such cell parameter specific policies may include, for example, one or more policies for connection establishment with one or more cells based on cell parameters. Such parameters may include, such as described above, one or a combination of multiple of: whether a cell is a primary/secondary cell; frequency bands at which different a cell operates; whether a cell operates using licensed/unlicensed radio frequency spectrum band; whether a cell operates using licensed/authorized shared radio frequency spectrum band, or a RAT of the cell (e.g., E-UTRAN, LTE in contention-based radio frequency spectrum band, WLAN, GERAN, UTRAN, etc.), for example.

The P-GW 536 may then determine one or more cell configurations for the different cells based at least in part on the different cell-parameters of each different cell and include the one or more cell configurations in a Create Session Response 550 to S-GW 534. In some examples, a new information element (IE) may be included with Create Session Response 550 that may include information of the one or more cell configurations. Such cell configurations may be determined separately for downlink and for uplink, and may include, for example, a desired percentage of bytes transmitted over an unlicensed radio frequency spectrum band or an authorized shared access (ASA) radio frequency spectrum band as compared to bytes transmitted over a licensed radio frequency spectrum band (which may include cases of traffic served only over unlicensed radio frequency spectrum band and traffic served only over licensed radio frequency spectrum band), a maximum amount of bytes to be transmitted over a licensed radio frequency spectrum band, a maximum bit rate or a minimum bit rate that may be served over cells with particular parameters, applications or application types served over a cell, bearer or bearer types served over a cell, service data flows (SDFs) served over a cell, prioritization rules for transmission over cells with identified cell parameters (e.g., transmit over first cell up to certain rate, rest of traffic (if any) over cell two), a type of data served by a cell (e.g., based on QoS requirements), or an amount of air interface resources available on a cell.

First downlink data 555 may also be provided from P-GW 536 to S-GW 534. The S-GW 534 may forward the one or more configurations in Create Session Response message 560 to MME 532. MME 532 may then forward the one or more cell configurations to eNB 505 in Bearer Setup Request message 565. The eNB 505 may be an example of an access node or eNB 105, 205 and/or 305 of FIGS. 1, 2 and/or 3, for example. The eNB 505 may then use the one or more cell configurations to determine how the bearer is served. For example if the bearer is forbidden on WLAN RAT then the eNB 505 may not initiate WLAN interworking for UE 515 if there are no WLAN allowed bearers. In another example, if WLAN RAT is allowed, the eNB 505 may initiate the WLAN interworking Following bearer setup by the eNB 505, the steps of the EPS bearer activation of FIG. 5 indicated at 570 correspond to established EPS bearer activation messages transferred between one or more of the UE 515, eNB 505, MME 532, S-GW 534, P-GW 536, and HSS 520 (which may be an example of HSS 220 of FIG. 2, for example). In some examples, as noted above, cell configurations may be determined separately for uplink and downlink transmissions, and the P-GW 536 may determine one or more cell configurations for uplink and downlink communications based at least in part on the different cell-parameters of each different cell. In some examples, P-GW 536 may adjust cell configurations response to modify bearer request 575.

Figure 6:
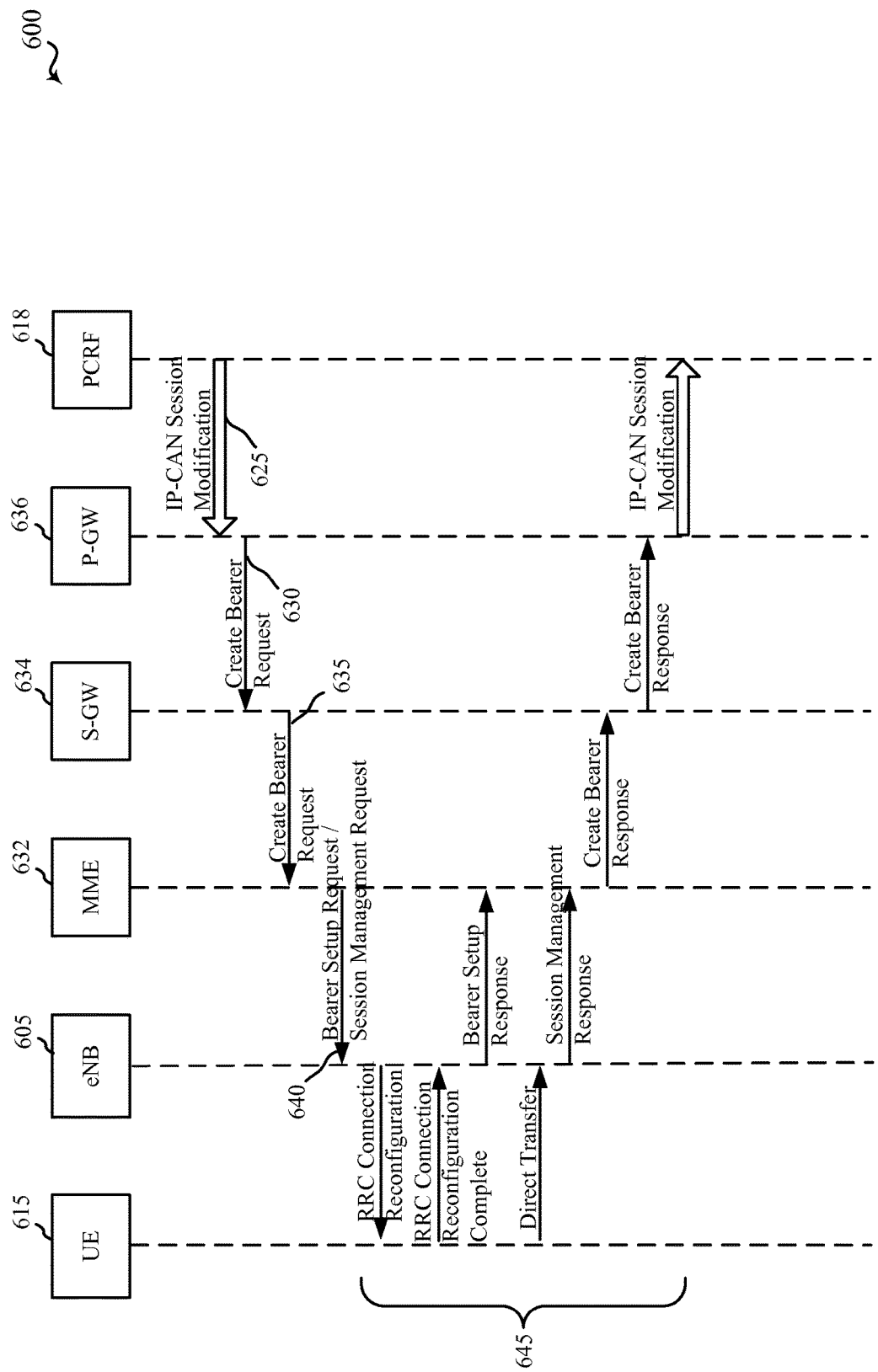
FIG. 6 is another flow diagram illustrating exemplary operations for cell configuration during dedicated EPS bearer activation, in accordance with aspects of the present disclosure.

FIG. 6 is another flow diagram 600 illustrating exemplary operations for cell configuration during dedicated EPS bearer activation, in accordance with aspects of the present disclosure. The PCRF 618, which may be an example of PCRF 518 of FIG. 5, for example, may provide cell-parameter specific policies to P-GW 636 for a dedicated bearer in conjunction with IP-CAN session modification 625. P-GW 636 may be an example of P-GW 236 and/or 536 of FIGS. 2 and/or 5, for example. P-GW 636 may then determine one or more cell configurations, and include the one or more cell configurations in a Create Bearer Request 630 to S-GW 634. S-GW 634 may be an example of S-GW 234 and/or 534 of FIGS. 2 and/or 5, for example. In some examples, a new information element (IE) may be included with Create Bearer Request 630 that may include information of the one or more cell configurations.

Similarly as discussed above, the one or more cell configurations may be determined separately for downlink and for uplink, and may include, for example, a desired percentage of bytes transmitted over an unlicensed radio frequency spectrum band or an authorized shared access radio frequency spectrum band as compared to bytes transmitted over a licensed radio frequency spectrum band (which may include cases of traffic served only over unlicensed radio frequency spectrum band and traffic served only over licensed radio frequency spectrum band), a maximum amount of bytes to be transmitted over a licensed radio frequency spectrum band, a maximum bit rate or a minimum bit rate that may be served over cells with particular parameters, applications or application types served over a cell, bearer or bearer types served over a cell, service data flows (SDFs) served over a cell, prioritization rules for transmission over cells with identified cell parameters (e.g., transmit over first cell up to certain rate, rest of traffic (if any) over cell two), a type of data served by a cell (e.g., based on QoS requirements), or an amount of air interface resources available on a cell.

The S-GW 634 may then forward the one or more cell configurations in Create Bearer Request message 635 to MME 632. MME 632 may be an example of MME 232 and/or 532 of FIGS. 2 and/or 5, for example. MME 632 may then forward the one or more cell configurations to eNB 605 in Bearer Setup Request message 640 via control plane signaling, for example. The eNB 605 may be an example of an access node or eNB 105, 205, 305 and/or 505 of FIGS. 1, 2, 3 and/or 5, for example. The eNB 605 may then use the one or more cell configurations to determine how the bearer is served for UE 615. The UE 615 may be an example of UEs 115, 215, 315 and/or 515 of FIGS. 1, 2, 3 and/or 5. For example, if the bearer is forbidden on WLAN RAT then the eNB 605 may not initiate WLAN interworking for UE 615 if there are no WLAN allowed bearers. In another example, if WLAN RAT is allowed, the eNB 605 may initiate the WLAN interworking. Following bearer setup by the eNB 605, the steps of the EPS bearer activation of FIG. 6, indicated at 645, correspond to established EPS bearer activation messages transferred between one or more of the UE 615, eNB 605, MME 632, S-GW 634, P-GW 636, and PCRF 618.

Figure 7:
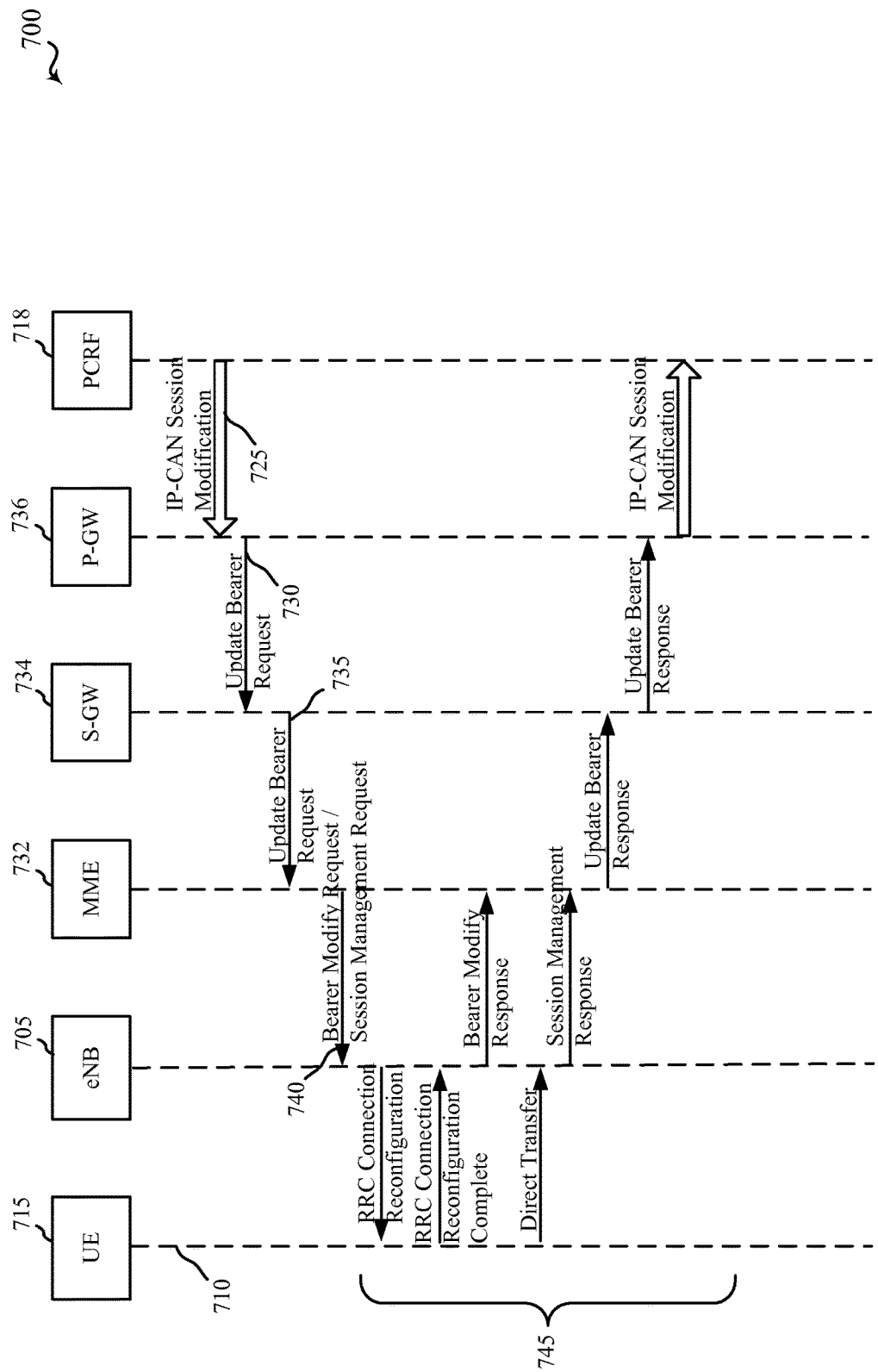
FIG. 7 is another flow diagram illustrating exemplary operations for cell configuration during EPS bearer modification, in accordance with aspects of the present disclosure.

FIG. 7 is another flow diagram 700 illustrating exemplary operations for cell configuration during EPS bearer modification, in accordance with aspects of the present disclosure. In addition to currently defined triggers for network initiated EPS bearer modification, in some examples the network may initiate an EPS bearer modification procedure due to change of policies or conditions regarding cell parameter. For example, the UE 715, which may be an example of UEs 115, 215, 315, 515 and/or 615 of FIGS. 1, 2, 3, 5 and/or 6, may have achieved a maximum threshold of licensed radio frequency spectrum band usage given a user's data plan, and the network may trigger this procedure to indicate to eNB 705 that only unlicensed or authorized shared radio frequency spectrum band can be used. The eNB 705 may be an example of an access node or eNB 105, 205, 305, 505 and/or 605 of FIGS. 1, 2, 3, 5 and/or 6, for example.

The PCRF 718, which may be an example of PCRF 518 and/or 618 of FIGS. 5 and/or 6, for example, may provide updated cell-parameter specific policies to P-GW 736 for an updated bearer in conjunction with IP-CAN session modification 725. P-GW 736 may be an example of P-GW 236, 536 and/or 636 of FIGS. 2, 5 and/or 6, for example. P-GW 736 may then determine one or more cell configurations based at least in part on the updated cell-parameter specific policies, and include the one or more cell configurations in an Update Bearer Request 730 to S-GW 734. S-GW 734 may be an example of S-GW 234, 534 and/or 634 of FIGS. 2, 5 and/or 6, for example. In some examples, a new information element (IE) may be included with Update Bearer Request 730 that may include information of the one or more cell configurations. The P-GW 736 may also include some indication to UE 715 about this change.

Similarly as discussed above, the one or more cell configurations may be determined separately for downlink and for uplink, and may include, for example, a desired percentage of bytes transmitted over an unlicensed radio frequency spectrum band or an authorized shared access radio frequency spectrum band as compared to bytes transmitted over a licensed radio frequency spectrum band (which may include cases of traffic served only over unlicensed radio frequency spectrum band and traffic served only over licensed radio frequency spectrum band), a maximum amount of bytes to be transmitted over a licensed radio frequency spectrum band, a maximum bit rate or a minimum bit rate that may be served over cells with particular parameters, applications or application types served over a cell, bearer or bearer types served over a cell, service data flows (SDFs) served over a cell, prioritization rules for transmission over cells with identified cell parameters (e.g., transmit over first cell up to certain rate, rest of traffic (if any) over cell two), a type of data served by a cell (e.g., based on QoS requirements), or an amount of air interface resources available on a cell.

The S-GW 734 may then forward the one or more cell configurations in Update Bearer Request message 735 to MME 732. MME 732 may be an example of MME 232, 532 and/or 632 of FIGS. 2, 5 and/or 6, for example. MME 732 may then forward the one or more cell configurations to eNB 705 in Bearer Modify Request message 740 via control plane signaling, for example. The eNB 705 may then use the one or more cell configurations to modify how the bearer is served for UE 715. For example, if the bearer is forbidden on WLAN RAT then the eNB 705 may not initiate WLAN interworking for UE 715 if there are no WLAN allowed bearers. In another example, if WLAN RAT is allowed, the eNB 705 may initiate the WLAN interworking. Following bearer setup by the eNB 705, the steps of the EPS bearer activation of FIG. 7, indicated at 745, correspond to established EPS bearer activation messages transferred between one or more of the UE 715, eNB 705, MME 732, S-GW 734, P-GW 736, and PCRF 718.

According to other examples, an MME, such as MME 232, 532, 632 and/or 732 of FIGS. 2, 5, 6 and/or 7, for example, may provide one or more cell configurations. In such examples, the MME may provide the one or more cell configurations to the RAN. The one or more cell configurations may be based at least in part on subscription information received from HSS (e.g., HSS 220 and/or 520 of FIGS. 2 and/or 5) and/or configuration. For example, the MME may determine one or more cell configurations for each UE. According to some examples, the MME may provide the one or more cell configurations during S1-AP context setup between MME and eNB for each UE. An S1-AP context may be setup when a UE is establishing a new connection with an eNB, such as, for example, during an attach procedure, a tracking area updating procedure, a service request procedure, and/or a handover procedure (established between a target eNB and a target MME). The MME in such examples may provide cell-parameter specific cell configurations in an Initial Context Setup request sent to the eNB.

Figure 8:
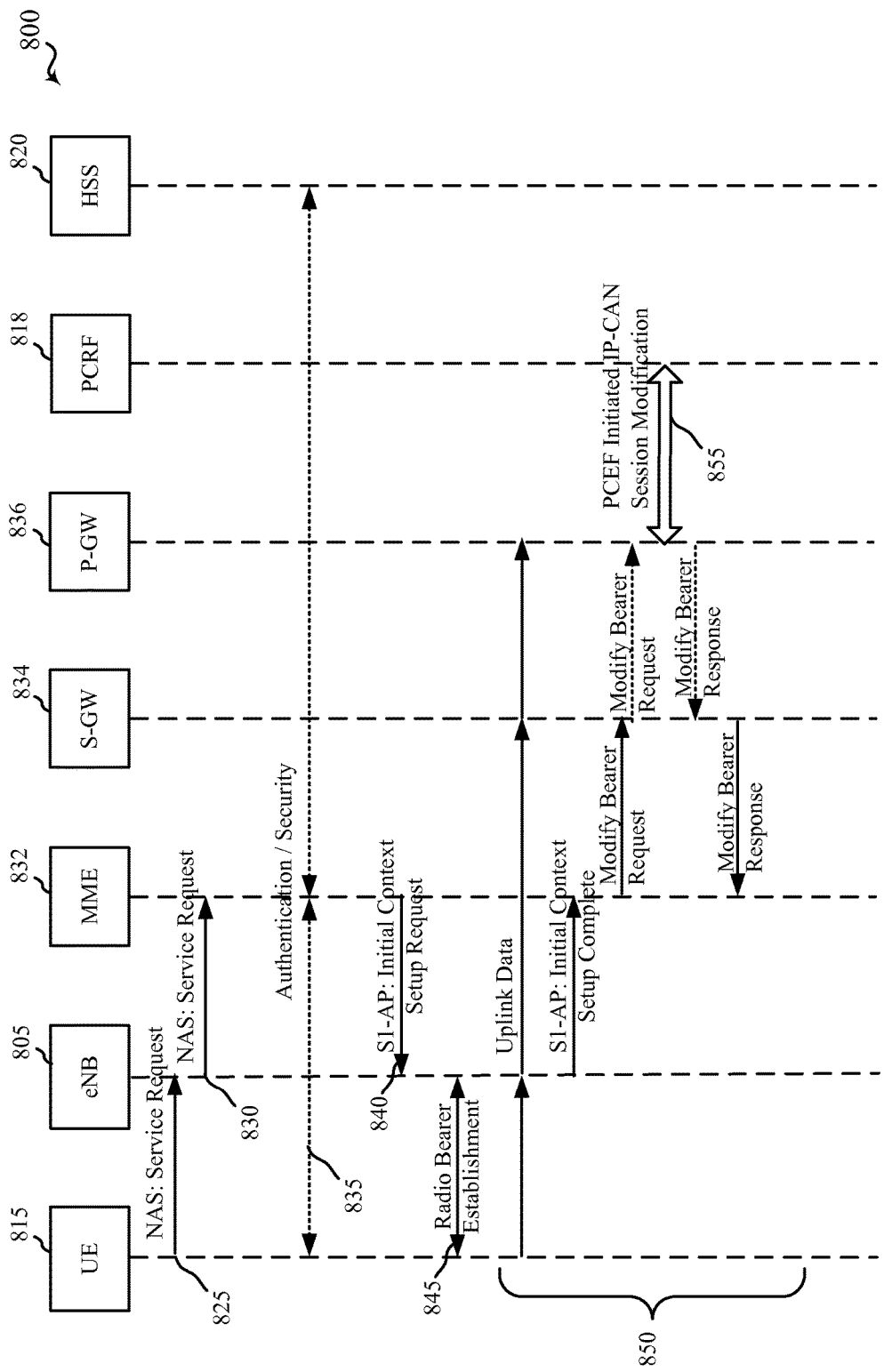
FIG. 8 is a flow diagram illustrating exemplary operations for cell configuration at an MME, in accordance with aspects of the present disclosure.

FIG. 8 is a flow diagram 800 illustrating exemplary operations for cell configuration at an MME, in accordance with aspects of the present disclosure. Such cell configuration may be established through a Service Request procedure 825. In this procedure, UE 815 provides a network access stratum (NAS) service request to eNB 805. UE 815 may be an example of UEs 115, 215, 315, 515, 615 and/or 715 of FIGS. 1, 2, 3, 5, 6 and/or 7, for example. The eNB 805 may be an example of an access node or eNB 105, 205, 305, 505, 605 and/or 705 of FIGS. 1, 2, 3, 5, 6 and/or 7, for example. The eNB 805 forwards the service request 830 to MME 832, which may be an example of MME 232, 532, 632, and/or 732 of FIGS. 2, 5, 6, and/or 7, for example. Authentication/security 835 is established between UE 815, MME 832, and HSS 820, which may be an example of HSS 220 and/or 520 of FIGS. 2 and/or 5, for example.

The MME 832 may determine one or more cell configurations based at least in part on the cell parameters and provide the cell-parameter specific cell configurations to the eNB 805 through initial context setup request message 840. Similarly as discussed above, the one or more cell configurations may be determined separately for downlink and for uplink, and may include, for example, a desired percentage of bytes transmitted over an unlicensed radio frequency spectrum band or an authorized radio frequency spectrum band as compared to bytes transmitted over a licensed radio frequency spectrum band (which may include cases of traffic served only over unlicensed radio frequency spectrum band and traffic served only over licensed radio frequency spectrum band), a maximum amount of bytes to be transmitted over a licensed radio frequency spectrum band, a maximum bit rate or a minimum bit rate that may be served over cells with particular cell parameters, applications or application types served over a cell, bearer or bearer types served over a cell, service data flows (SDFs) served over a cell, prioritization rules for transmission over cells with identified cell parameters (e.g., transmit over first cell up to certain rate, rest of traffic (if any) over cell two), a type of data served by a cell (e.g., based on QoS requirements), or an amount of air interface resources available on a cell. The eNB 805 may then use the one or more cell configurations to setup how the bearer is established, as indicated at 845, for UE 815. Following bearer establishment by the eNB 805, the steps of FIG. 8, indicated at 850, correspond to established EPS bearer messages transferred between one or more of the UE 815, eNB 805, MME 832, S-GW 834, P-GW 836, PCRF 818, and HSS 820. In some examples, as noted above, cell configurations may be determined separately for uplink and downlink transmissions, and the P-GW 836 may determine one or more cell configurations for uplink and downlink communications based at least in part on the different cell parameters of each different cell. In some examples, P-GW 836 may adjust cell configurations in response to an IP-CAN session modification 855, during which P-GW 836 may receive from PCRF 818 one or more some cell-parameter specific policies, if available, for the modified bearer.

In addition the MME 832 may, in some examples, initiate a UE Context Modification procedure to change the cell configurations during the course of a connection such as, for example, if the UE 815 hands over to a new area where a different cell-parameter specific cell configurations apply.

In other examples, cell-parameter specific cell configurations may be provisioned via an operations, administration, and maintenance (OAM) functions of the wireless communication system, such as wireless communications system 100 of FIG. 1, for example. In such examples, the cell-parameter specific cell configurations may be configured into the RAN via the OAM function. Such rules, in some examples, may be configured into an eNB at any point, or upon certain triggers such as one or more trigger events as discussed above. The various methods (e.g., P-GW, MME and OAM) of determining one or more cell configurations for different cells as described above, may be combined and operate distantly or jointly in a wireless communication network.

Figure 9A:
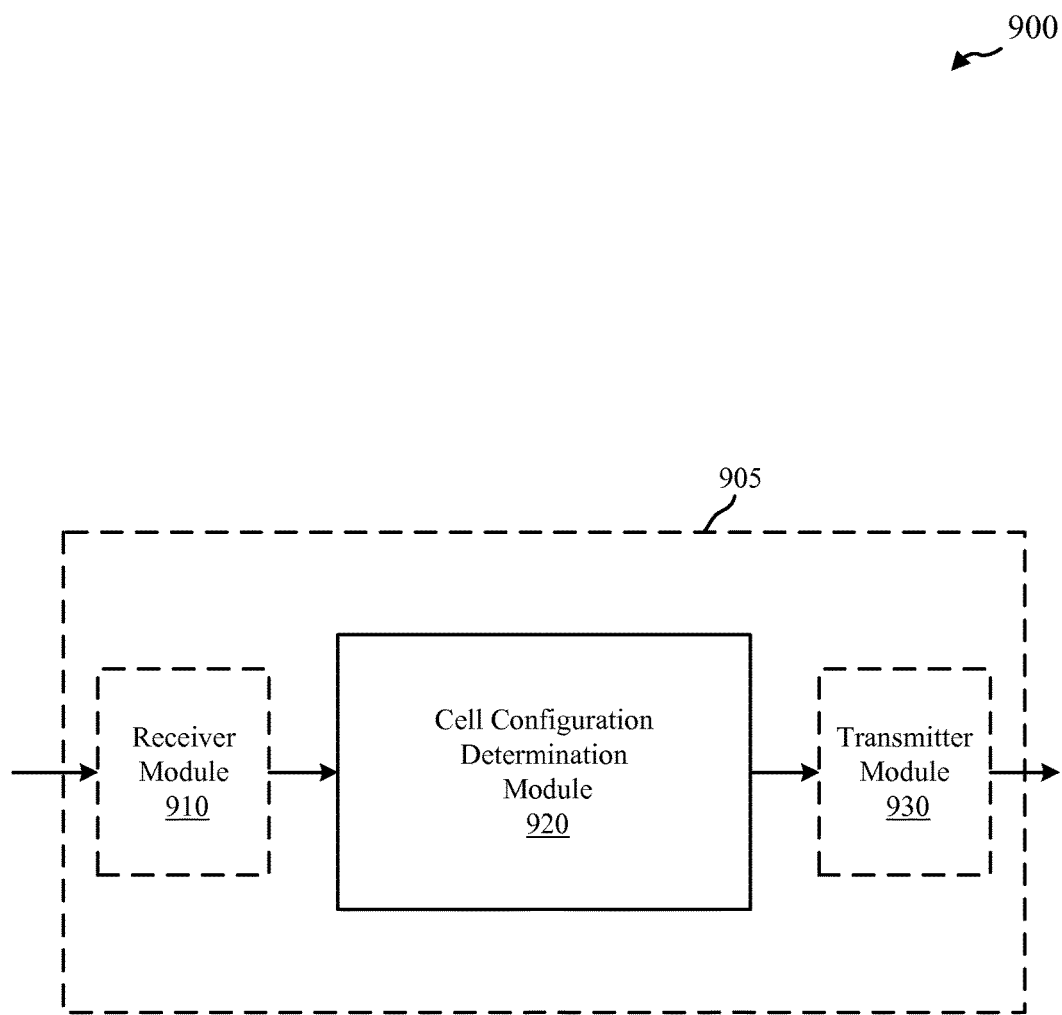
FIGS. 9A and 9B are block diagrams conceptually illustrating devices, such as eNBs or core network elements, for use in cell configuration determination in accordance with aspects of the present disclosure.
Figure 9B:
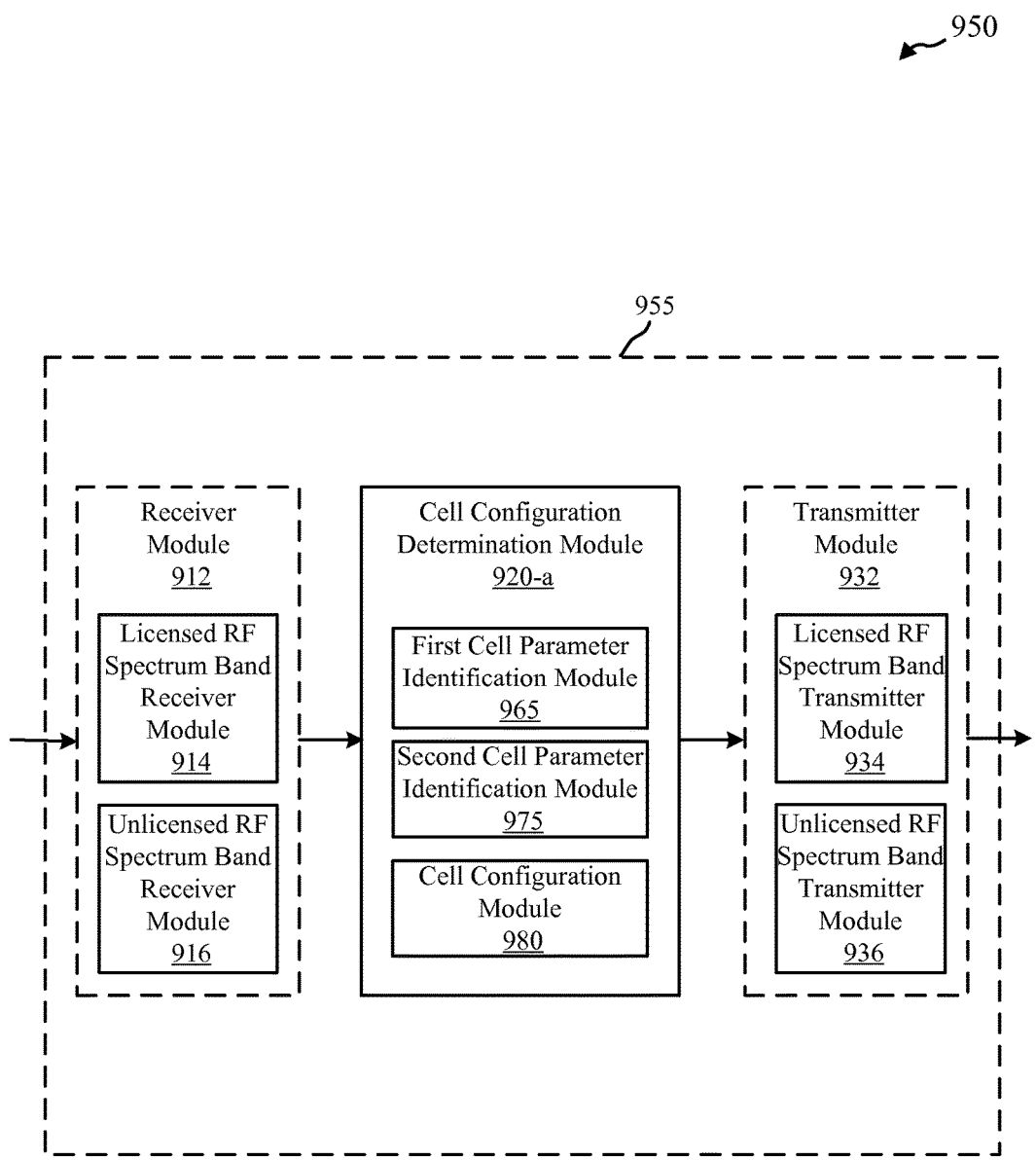

FIGS. 9A and 9B are block diagrams conceptually illustrating devices, such as eNBs or core network elements, for use in cell configuration determination in accordance with aspects of the present disclosure. Referring first to FIG. 9A, a block diagram 900 illustrates a device 905 for use in cell configuration determination in accordance with various examples. In some examples, the device 905 may be an example of one or more aspects of the access nodes or eNBs 105, 205, 305, 505, 605, 705 and/or 805; MMEs 232, 532, 632, 732 and/or 832; S-GWs 234, 534, 634, 734 and/or 834; and/or P-GWs 236, 536, 636, 736 and/or 836 described with reference to FIGS. 1, 2, 3, 5, 6, 7 and/or 8. The device 905 may also include a processor. The device 905 may include a receiver module 910, a cell configuration determination module 920, and/or a transmitter module 930. Each of these components may be in communication with each other.

The components of the device 905 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, device 905 may be an example of an access node and the receiver module 910 may be or include a radio frequency (RF) receiver, such as an RF receiver operable to receive transmissions in a licensed radio frequency spectrum band (e.g., LTE in licensed radio frequency spectrum band) and/or an unlicensed radio frequency spectrum band (e.g., LTE in unlicensed radio frequency spectrum band). The receiver module 910 may be used to receive various types of data and/or control signals (i.e., transmissions) over one or more communication links of a wireless communications system including the licensed and unlicensed radio frequency spectrum bands, such as one or more communication links of the wireless communications system 125, 240, 245, and/or 320-340 described with reference to FIGS. 1, 2, and/or 3. In some examples, device 905 may be an example of a network element of a core network, and the receiver module 910 may be or include a network communications component that may receive network communications via a wired network interface.

In some examples, device 905 may be an example of an access node and the transmitter module 930 may be or include an RF transmitter, such as an RF transmitter operable to transmit in the licensed radio frequency spectrum band and/or the unlicensed radio frequency spectrum band. The transmitter module 930 may be used to transmit various types of data and/or control signals (i.e., transmissions) over one or more communication links of a wireless communications system, such as one or more communication links 125, 240, 245, and/or 320-340 of the wireless communications system 100, 200, and/or 300 described with reference to FIGS. 1, 2, and/or 3. In some examples, device 905 may be an example of a network element of a core network, and the transmitter module 930 may be or include a network communications component that may transmit network communications via a wired network interface.

In some examples, the cell configuration determination module 920 may configure and/or perform cell configuration determination procedures, including determination of cell configurations served over one or more different cells associated with an access point, such as described above with respect to FIGS. 1-8, for example.

Referring now to FIG. 9B, a block diagram 950 illustrates a device 955 for use in wireless communications in accordance with various aspects of the present disclosure. In some examples, the device 955 may be an example of one or more aspects of the access nodes or eNBs 105, 205, 305, 505, 605, 705 and/or 805; MMEs 232, 532, 632, 732 and/or 832; S-GWs 234, 534, 634, 734, and/or 834; and/or P-GWs 236, 536, 636, 736 and/or 836 described with reference to FIGS. 1, 2, 3, 5, 6, 7, and/or 8. The device 955 may also include a processor. The device 955 may include a receiver module 912, a cell configuration determination module 920-a, and/or a transmitter module 932. Each of these components may be in communication with each other.

The components of the device 955 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 912 may be an example of the receiver module 910 of FIG. 9A. In examples where device 955 is included in an access node, the receiver module 912 may be or include a radio frequency (RF) receiver, such as an RF receiver operable to receive transmissions in a licensed radio frequency spectrum band (e.g., LTE in licensed radio frequency spectrum band) and/or an unlicensed radio frequency spectrum band (e.g., LTE in unlicensed radio frequency spectrum band). The RF receiver may include separate receivers for the licensed radio frequency spectrum band and the unlicensed radio frequency spectrum band. The separate receivers may in some cases take the form of a licensed RF spectrum band receiver module 914 and an unlicensed RF spectrum band receiver module 916. The receiver module 912, including the licensed RF spectrum band receiver module 914 and the unlicensed RF spectrum band receiver module 916, may be used to receive various types of data and/or control signals (i.e., transmissions) over one or more communication links of a wireless communications system including the licensed and unlicensed radio frequency spectrum bands, such as one or more communication links of the wireless communications system 100, 200 and/or 300 described with reference to FIGS. 1, 2 and/or 3.

In some examples, the transmitter module 932 may be an example of the transmitter module 930 of FIG. 9A. In examples where device 955 is included in an access node, the transmitter module 932 may be or include an RF transmitter, such as an RF transmitter operable to transmit in the licensed radio frequency spectrum band and/or the unlicensed radio frequency spectrum band. The RF transmitter may include separate transmitters for the licensed radio frequency spectrum band and the unlicensed radio frequency spectrum band. The separate transmitters may in some cases take the form of a licensed RF spectrum band transmitter module 934 and an unlicensed RF spectrum band transmitter module 936. The transmitter module 932 may be used to transmit various types of data and/or control signals (i.e., transmissions) over one or more communication links of a wireless communications system, such as one or more communication links of the wireless communications system 100, 200 and/or 300 described with reference to FIGS. 1, 2 and/or 3.

The cell configuration determination module 920-*a* may be an example of the cell configuration determination module 920 described with reference to FIG. 9A and may include a first cell parameter identification module 965, a second cell parameter identification module 975, and/or a cell configuration module 980. Each of these components may be in communication with each other.

In some examples, the first cell parameter identification module 965 may identify cell parameters of a first cell. The second cell parameter identification module 975 may identify cell parameters of a second cell. Such parameters may be one or more of the cell parameters such as described above. The cell configuration module 980 may determine one or more cell configurations based at least in part on the cell parameters of the one or more cells and provide the cell configurations for one or more cells that are to serve all of portions of a traffic stream for a UE. The cell configuration determination module 920-*a* alone or in conjunction with receiver module 912 and transmitter module 932, may perform functions related to performance of cell configuration determination procedures, including determination of cell parameters and configurations, such as described above with respect to FIGS. 1-8, for example.

Figure 10:
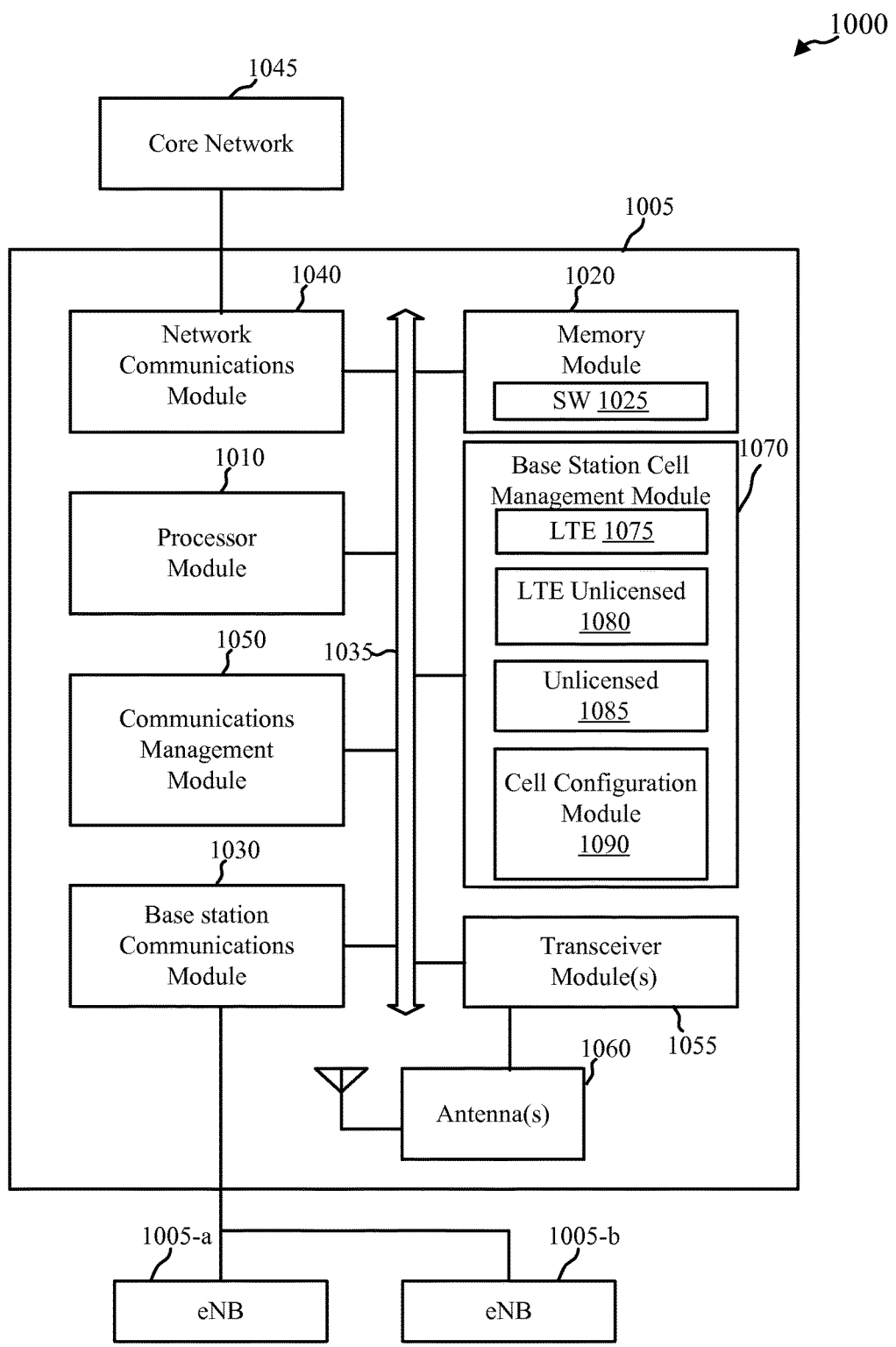
FIG. 10 is a block diagram conceptually illustrating a design of a base station, in accordance with aspects of the present disclosure.

FIG. 10 is a block diagram 1000 conceptually illustrating a design of a base station, in accordance with aspects of the present disclosure. In some examples, the base station 1005 may be an example of one or more aspects of the access nodes or devices 105, 205, 305, 505, 605, 705, 805, 905, and/or 955 described with reference to FIGS. 1, 2, 3, 5, 6, 7, 8, 9A, and/or 9B. The base station 1005 may be configured to implement at least some of the features and functions for operations of reporting cell configurations provided by one or more different cells to a UE as described with respect to FIGS. 1, 2, 3, 4, 5, 6, 7, 8, 9A, and/or 9B. The base station 1005 may include a processor module 1010, a memory module 1020, at least one transceiver module (represented by transceiver module(s) 1055), at least one antenna (represented by antenna(s) 1060), and/or a base station cell management module 1070. The base station 1005 may also include one or both of a base station communications module 1030 and a network communications module 1040. Each of these components may be in communication with each other, directly or indirectly, over one or more buses 1035.

The memory module 1020 may include random access memory (RAM) and/or read-only memory (ROM). The memory module 1020 may store computer-readable, computer-executable software (SW) code 1025 containing instructions that are configured to, when executed, cause the processor module 1010 to perform various functions described herein for reporting of cell configurations for one or more cells. Alternatively, the software code 1025 may not be directly executable by the processor module 1010 but be configured to cause the base station 1005, e.g., when compiled and executed, to perform various of the functions described herein.

The processor module 1010 may include an intelligent hardware device, e.g., a central processing unit (CPU), a microcontroller, an ASIC, etc. The processor module 1010 may process information received through the transceiver module(s) 1055, the base station communications module 1030, and/or the network communications module 1040. The processor module 1010 may also process information to be sent to the transceiver module(s) 1055 for transmission through the antenna(s) 1060, to the base station communications module 1030 for transmission to one or more other base stations or eNBs 1005-*a* and 1005-*b*, and/or to the network communications module 1040 for transmission to a core network 1045, which may be an example of aspects of the core network 130 and/or EPC 230 described with reference to FIGS. 1 and/or 2, and/or other network elements of a core network described with respect to FIGS. 5, 6, 7 and/or 8. The processor module 1010 may handle, alone or in connection with the base station cell management module 1070, various aspects of using two or more cells for wireless communications with one or more UEs, such as described above.

The transceiver module(s) 1055 may include a modem configured to modulate packets and provide the modulated packets to the antenna(s) 1060 for transmission, and to demodulate packets received from the antenna(s) 1060. The transceiver module(s) 1055 may be implemented as one or more transmitter modules and one or more separate receiver modules. The transceiver module(s) 1055 may support communications using one or more RATs, such as, for example, communications in at least one licensed radio frequency spectrum band (e.g., LTE in licensed radio frequency spectrum band) and in at least one unlicensed radio frequency spectrum band (e.g., LTE in unlicensed radio frequency spectrum band). The transceiver module(s) 1055 may be configured to communicate bi-directionally, via the antenna(s) 1060, with one or more of the UEs or devices 115, 215, 315, 515, 615, 715 and/or 815 described with reference to FIGS. 1, 2, 3, 5, 6, 7, and/or 8, for example. The base station 1005 may typically include multiple antennas 1060 (e.g., an antenna array). The base station 1005 may communicate with the core network 1045 through the network communications module 1040. The base station 1005 may communicate with other base stations or eNBs, such as the eNBs 1005-*a* and 1005-*b*, using the base station communications module 1030.

According to the architecture of FIG. 10, the base station 1005 may further include a communications management module 1050. The communications management module 1050 may manage communications with other access nodes, base stations, and/or devices. The communications management module 1050 may be in communication with some or all of the other components of the base station 1005 via the bus or buses 1035. Alternatively, functionality of the communications management module 1050 may be implemented as a component of the transceiver module(s) 1055, as a computer program product, and/or as one or more controller elements of the processor module 1010.

The base station cell management module 1070 may be configured to perform and/or control some or all of the cell parameter determination and cell configuration functions or aspects described with reference to FIGS. 1, 2, 3, 4, 5, 6, 7, 8, 9A, and/or 9B. The base station cell management module 1070 may include an LTE module 1075 configured to handle LTE communications, an LTE unlicensed module 1080 configured to handle LTE in contention-based radio frequency spectrum band communications, and/or an unlicensed module 1085 configured to handle communications other than LTE in contention-based radio frequency spectrum band (e.g., Wi-Fi communications in a WLAN). The base station cell management module 1070 may also include a cell configuration module 1090 configured to provide, for example, any of the functions that support cell parameter determination and cell configuration determination described with reference to FIGS. 1, 2, 3, 4, 5, 6, 7, 8, 9A, and/or 9B. The cell configuration module 1090 may be an example of similar modules (e.g., module 920 and/or module 920-*a*) described with reference to FIGS. 9A and/or 9B. The base station cell management module 1070, or portions of it, may include a processor and/or some or all of the functionality of the base station cell management module 1070 may be performed by the processor module 1010 and/or in connection with the processor module 1010.

Figure 11:
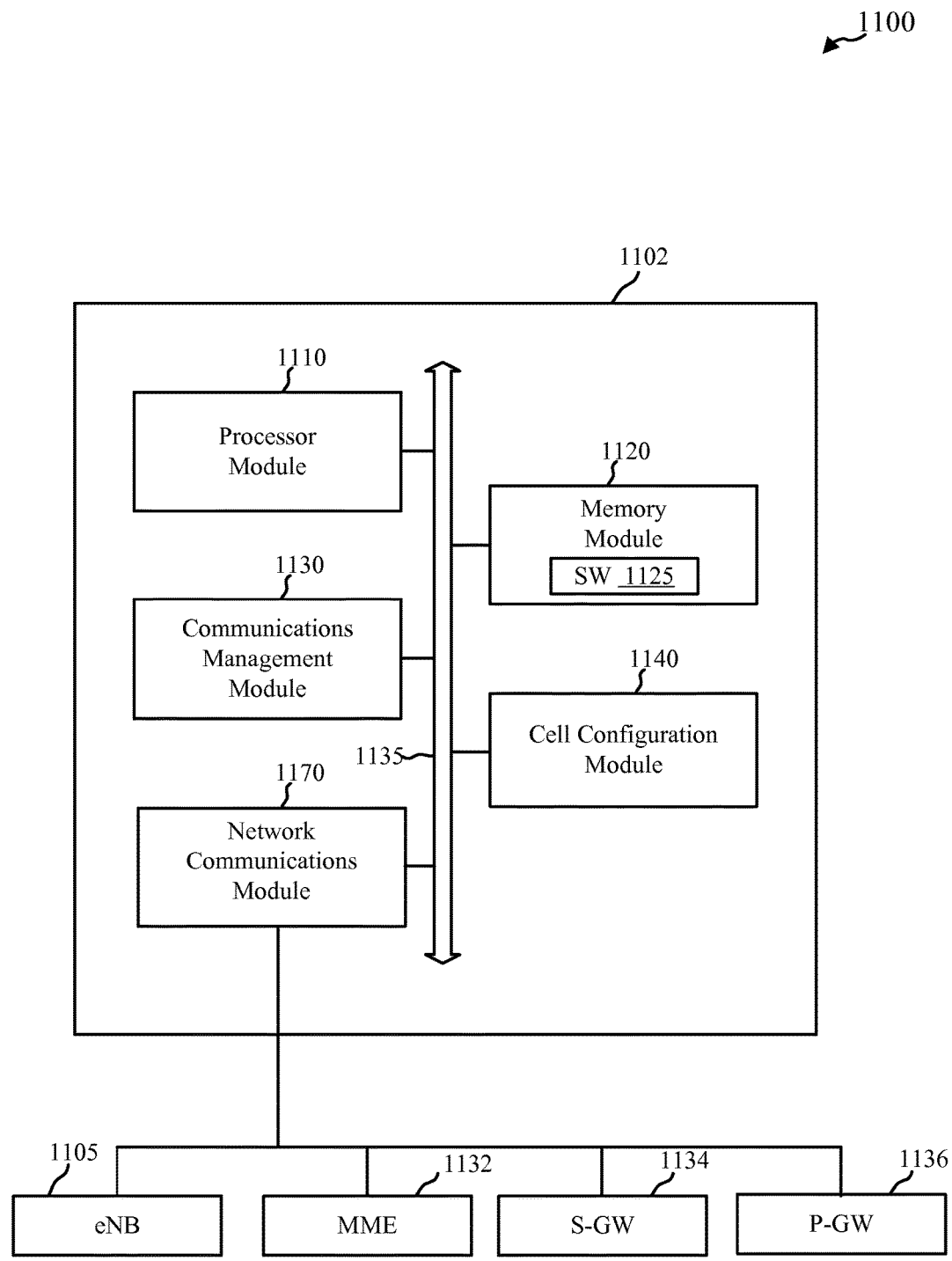
FIG. 11 is a block diagram conceptually illustrating a design of a node in a core network, in accordance with aspects of the present disclosure.

FIG. 11 is a block diagram 1100 conceptually illustrating a design of a node in a core network, in accordance with aspects of the present disclosure. Node 1102, may be an example of a MME 232, 532, 632, 732, 832, a S-GW 234, 534, 634, 734, 834 or a P-GW 236, 546, 636, 736, and/or 836 in accordance with aspects of the present disclosure. The node 1102 may be configured to implement at least some of the features and functions for operations related to cell parameter and configuration determination provided for one or more different cells for serving a UE as described with respect to FIGS. 1, 2, 3, 4, 5, 6, 7, 8, 9A, 9B, and/or 10. The node 1102 may be configured to communicate with one or more of the eNBs or devices 105, 205, 305, 505, 605, 705, 805, 905, 955 and/or 1005 described with reference to FIGS. 1, 2, 3, 5, 6, 7, 8, 9A, 9B, and/or 10.

The node 1102 may include a processor module 1110, a memory module 1120, a communications management module 1130, a cell configuration module 1140, and a network communications module 1170. Each of these components may be in communication with each other, directly or indirectly, over one or more buses 1135.

The memory module 1120 may include RAM and/or ROM. The memory module 1120 may store computer-readable, computer-executable software (SW) code 1125 containing instructions that are configured to, when executed, cause the processor module 1110 to perform various functions described herein related to cell configurations provided by one or more different cells to a UE. Alternatively, the software code 1125 may not be directly executable by the processor module 1110 but be configured to cause the UE (e.g., when compiled and executed) to perform various of the node 1102 functions described herein.

The processor module 1110 may include an intelligent hardware device, e.g., a CPU, a microcontroller, an ASIC, etc. The processor module 1110 may process information received through the network communications module 1170 and/or information to other network elements, such as eNB 1105, MME 1132, S-GW 1134, and/or P-GW 1136. The processor module 1110 may handle, alone or in connection with the cell configuration module 1140, various aspects of operations related to cell parameter determination and/or cell configuration determination described with reference to FIGS. 1, 2, 3, 4, 5, 6, 7, 8, 9A, 9B, and/or 10.

The communications management module 1130 may manage communications with other network elements, such as eNB 1105, MME 1132, S-GW 1134, and/or P-GW 1136. The communications management module 1130 may be in communication with some or all of the other components of the node 1102 via the bus or buses 1135. Alternatively, functionality of the communications management module 1130 may be implemented as a component of the network communications module 1170, as a computer program product, and/or as one or more controller elements of the processor module 1110.

The cell configuration module 1140 may be configured to perform and/or control some or all of the cell parameter determination and cell configuration determination functions or aspects described in FIGS. 1, 2, 3, 4, 5, 6, 7, 8, 9A, 9B, and/or 10. For example, the cell configuration module 1140 may be configured to receive cell parameter information and generate cell configuration information based on the cell parameter information. The cell configuration module 1140 may be an example of similar modules (e.g., module 920 and/or module 920-*a*) described with reference to FIGS. 9A and/or 9B. The cell configuration module 1140, or portions of it, may include a processor and/or some or all of the functionality of the cell configuration module 1140 may be performed by the processor module 1110 and/or in connection with the processor module 1110.

Figure 12:
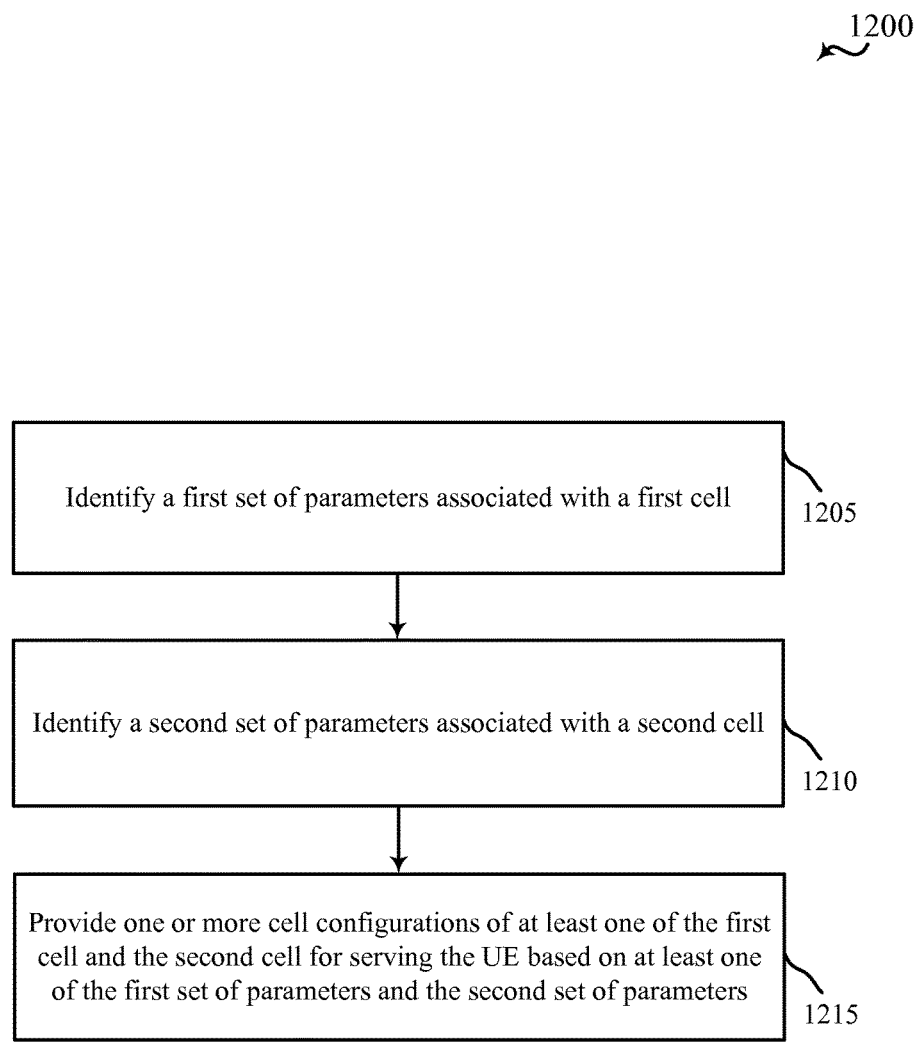
FIG. 12 is a flowchart conceptually illustrating an example of a method of wireless communication, in accordance with aspects of the present disclosure.

FIG. 12 is a flowchart conceptually illustrating an example of a method 1200 of wireless communication, in accordance with aspects of the present disclosure. For clarity, the method 1200 is described below with reference to ones of the network nodes such as a node in core network 130 of FIGS. 1 and/or EPC 230 of FIG. 2. Such a node may include, for example, one or more of devices 232, 234, 236, 532, 534, 536, 632, 634, 636, 732, 734, 736, 832, 834, 836, 920, 920-*a*, and/or 1102 described with reference to FIGS. 2, 5, 6, 7, 8, 9A, 9B, and/or 11. In one example, a network node or device may execute one or more sets of codes to control the functional elements of the access node or device to perform the functions described below.

At block 1205, a first set of parameters associated with a first cell are identified. The operation(s) at block 1205 may in some cases be performed using the cell configuration determination module 920 in conjunction with the other components described with reference to FIG. 9A, the first cell parameter identification module 965 in conjunction with the other components described with reference to FIG. 9B, and/or cell configuration module 1140 in conjunction with the other components described with reference to FIG. 11.

At block 1210, a second set of parameters associated with a second cell is identified. The operation(s) at block 1210 may in some cases be performed using the cell configuration determination module 920 in conjunction with the other components described with reference to FIG. 9A, the second cell parameter identification module 975 in conjunction with the other components described with reference to FIG. 9B, and/or cell configuration module 1140 in conjunction with the other components described with reference to FIG. 11.

At block 1215, one or more cell configurations of at least one of the first cell and the second cell for serving the UE is provided based on at least one of the first set of parameters and the second set of parameters. The operation(s) at block 1215 may in some cases be performed using the cell configuration determination module 920 and/or 920-*a* in conjunction with the other components described with reference to FIGS. 9A and/or 9B, and/or cell configuration module 1140 in conjunction with the other components described with reference to FIG. 11.

Thus, the method 1200 may provide for wireless communications in which cell parameters associated with different cells may be provided in order to enable, for example, different cell configurations for serving one or more UEs at the different cells. It should be noted that the method 1200 is just one implementation and that the operations of the method 1200 may be rearranged or otherwise modified such that other implementations are possible.

Figure 13:
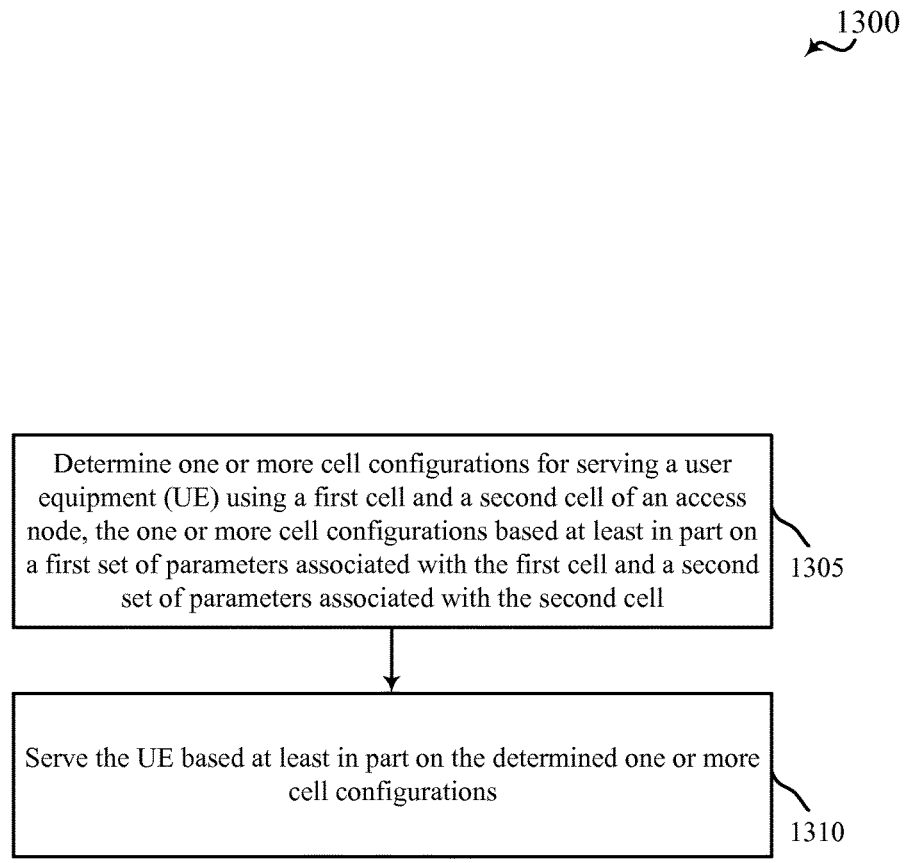
FIG. 13 is a flowchart conceptually illustrating an example of a method of wireless communication, in accordance with aspects of the present disclosure.

FIG. 13 is a flowchart conceptually illustrating an example of a method 1300 of wireless communication, in accordance with aspects of the present disclosure. For clarity, the method 1300 is described below with reference to ones of the access nodes, or devices 105, 205, 305, 505, 605, 705, 805, 905, 955, and/or 1005 described with reference to FIGS. 1, 2, 3, 5, 6, 7, 8, 9A, 9B, and/or 10. In one example, an access node or device may execute one or more sets of codes to control the functional elements of the access node or device to perform the functions described below. In some examples, an OAM function may configure the access nodes or devices to perform the operations of method 1300.

At block 1305, one or more cell configurations are determined for serving a UE using a first cell and a second cell of an access node, the one or more cell configurations may be based at least in part on a first set of parameters associated with the first cell and a second set of parameters associated with the second cell. The operation(s) at block 1305 may in some cases be performed using the cell configuration determination module 920 in conjunction with the other components described with reference to FIG. 9A, the cell configuration determination module 920-a in conjunction with the other components described with reference to FIG. 9B, and/or cell configuration module 1090 in conjunction with the other components described with reference to FIG. 10.

At block 1310, the UE is served based at least in part on the determined one or more cell configurations. The operation(s) at block 1310 may in some cases be performed using the receiver module 910 and transmitter module 930 in conjunction with the other components described with reference to FIG. 9A, the receiver module 912 and transmitter module 932 in conjunction with the other components described with reference to FIG. 9B, and/or transceiver module(s) 1055 and antenna(s) 1060 in conjunction with the other components described with reference to FIG. 10.

Thus, the method 1300 may provide for wireless communications in which cell configurations for different cells may be provided based on cell parameters for serving one or more UEs in order to enable, for example, serving of different traffic streams, or portions of traffic streams, using different cells. It should be noted that the method 1300 is just one implementation and that the operations of the method 1300 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication at an access node in a wireless communications network, comprising:
providing a first cell associated with a first set of parameters;
providing a second cell associated with a second set of parameters;
identifying, as part of an activation procedure or a modification procedure for at least one bearer associated with a user equipment (UE) served by the access node, at least one cell configuration for serving the UE over the first cell and the second cell, wherein the at least one cell configuration is based at least in part on the first set of parameters and the second set of parameters;
selecting a service allocation of the at least one bearer, the service allocation comprising one or more service data flows over at least one of the first cell and the second cell based at least in part on the at least one cell configuration; and
serving data traffic to the UE based at least in part on the selected service allocation.

2. The method of claim 1, wherein serving data traffic to the UE comprises:
serving a first subset of the one or more service data flows over the first cell; or
serving a second subset of the one or more service data flows over the second cell.

3. The method of claim 1, wherein the service allocation further comprises:
a percentage of traffic volume to be served over the first cell and a percentage of traffic volume to be served over the second cell.

4. The method of claim 1, further comprising
receiving information associated with the at least one cell configuration from a first network node based at least in part on:
a default bearer activation procedure between the access node and the UE.

5. The method of claim 4, further comprising:
receiving information associated with the at least one cell configuration from a second network node.

6. The method of claim 4, further comprising:
receiving information associated with the at least one cell configuration from the first network node as part of a bearer setup request message.

7. The method of claim 1, wherein the at least one cell configuration is provided:
for the UE;
for the at least one bearer of the UE;
for the one or more service data flows (SDFs);
for a class of UE; or
for all UEs to be served using one or more of the first cell or the second cell.

8. The method of claim 1, wherein serving the UE comprises:
determining whether to serve the UE over the first cell; and
determining whether to serve the UE over the second cell.

9. The method of claim 8, wherein determining whether to serve the UE over the first cell or the second cell comprises one or more of:
instructing the UE to establish a connection with each of the first cell and the second cell; or
instructing the UE to determine if access to the first cell or the second cell is available.

10. The method of claim 1, wherein the service allocation further comprises:
a maximum amount of traffic volume to be served over the first cell or the second cell, in combination with the one or more service data flows and based at least in part on the selecting.

11. The method of claim 1, wherein the service allocation further comprises:
a maximum bit rate to be served over the first cell or the second cell, in combination with the one or more service data flows and based at least in part on the selecting.

12. The method of claim 1, wherein the service allocation further comprises:
a minimum bit rate to be served over the first cell or the second cell, in combination with the one or more service data flows and based at least in part on the selecting.

13. The method of claim 1, wherein the service allocation further comprises:
an application type to be served over the first cell or the second cell, in combination with the one or more service data flows and based at least in part on the selecting.

14. The method of claim 1, wherein the service allocation further comprises:
one or more bearers to be served over the first cell or the second cell, in combination with the one or more service data flows and based at least in part on the selecting, wherein the one or more bearers comprise at least the at least one bearer.

15. The method of claim 1, wherein the service allocation further comprises:
a Quality of Service (QoS) requirement of traffic volume to be served by the first cell or the second cell, in combination with the one or more service data flows and based at least in part on the selecting.

16. The method of claim 1, wherein the service allocation further comprises:
one or more prioritization rules associated with the first cell or the second cell, in combination with the one or more service data flows and based at least in part on the selecting.

17. The method of claim 1, further comprising:
receiving information associated with the at least one cell configuration from a first network node based at least in part on:
a default bearer modification procedure between the access node and the UE.

18. The method of claim 17, further comprising:
receiving information associated with the at least one cell configuration from the first network node as part of a bearer modify request message.

19. The method of claim 1, further comprising:
receiving information associated with the at least one cell configuration from a first network node based at least in part on:
a dedicated bearer activation procedure between the access node and the UE.

20. The method of claim 19, further comprising:
receiving information associated with the at least one cell configuration from the first network node as part of a bearer setup request message.

21. The method of claim 1, further comprising:
receiving information associated with the at least one cell configuration from a first network node based at least in part on a dedicated bearer modification procedure between the access node and the UE.

22. The method of claim 21, further comprising:
receiving information associated with the at least one cell configuration from the first network node as part of a bearer modify request message.

23. The method of claim 1, further comprising:
receiving information associated with the at least one cell configuration from a first network node based at least in part on a cell configuration procedure between the access node and the UE.

24. The method of claim 23, further comprising:
establishing the cell configuration procedure through a service request procedure; and
receiving information associated with the at least one cell configuration from the first network node as part of an initial context setup request message.

25. The method of claim 1, further comprising:
receiving information associated with the at least one cell configuration from a first network node based at least in part on a connection establishment procedure between the access node and the UE.

26. The method of claim 1, wherein the first cell is provided via a first Radio Access Technology (RAT) and the second cell is provided via a second RAT different from the first RAT.

27. The method of claim 1, wherein the first cell is provided via a licensed radio frequency spectrum band and the second cell is provided via an unlicensed radio frequency spectrum band.

28. An apparatus for wireless communication at an access node in a wireless communications network, comprising:
means for providing a first cell associated with a first set of parameters;
means for providing a second cell associated with a second set of parameters;
means for identifying, as part of an activation procedure or a modification procedure for at least one bearer associated with a user equipment (UE) served by the access node, at least one cell configuration for serving the UE over the first cell and the second cell, wherein the at least one cell configuration is based at least in part on the first set of parameters and the second set of parameters;
means for selecting a service allocation of the at least one bearer, the service allocation comprising one or more service data flows over at least one of the first cell and the second cell based at least in part on the at least one cell configuration; and
means for serving data traffic to the UE based at least in part on the selected service allocation.

29. The apparatus of claim 28, wherein the means for serving data traffic to the UE serves a first subset of the one or more service data flows over the first cell or serves a second subset of the one or more service data flows over the second cell.

30. The apparatus of claim 28, wherein the service allocation further comprises one or more of:
a percentage of traffic volume to be served over the first cell and a percentage of traffic volume to be served over the second cell;
a maximum amount of traffic volume to be served over the first cell or the second cell;
a maximum bit rate to be served over the first cell or the second cell;
a minimum bit rate to be served over the first cell or the second cell;
an application type to be served over the first cell or the second cell;
one or more bearers to be served over the first cell or the second cell, wherein the one or more bearers comprise at least the at least one bearer;
one or more prioritization rules associated with the first cell or the second cell;
a Quality of Service (QoS) requirement of traffic volume to be served by the first cell or the second cell; or
an amount of air interface resources available to the first cell or the second cell.

31. The apparatus of claim 28, further comprising:
means for receiving information associated with the at least one cell configuration from a first network node based at least in part on:
a default bearer activation or a default bearer modification procedure between the access node and the UE.

32. The apparatus of claim 31, further comprising:
means for receiving information associated with the at least one cell configuration from a second network node.

33. The apparatus of claim 28, wherein the at least one cell configuration is provided:
for the UE;
for the at least one bearer of the UE;
for the one or more service data flows (SDFs);
for a class of UE; or
for all UEs to be served using one or more of the first cell or the second cell.

34. The apparatus of claim 28, wherein the means for serving the UE determines whether to serve the UE over the first cell and determines whether to serve the UE over the second cell.

35. The apparatus of claim 28, further comprising:
means for receiving information associated with the at least one cell configuration from a first network node based at least in part on a default bearer activation or a default bearer modification procedure between the access node and the UE.

36. The apparatus of claim 28, further comprising:
means for receiving information associated with the at least one cell configuration from a first network node based at least in part on a dedicated bearer activation or a dedicated bearer modification procedure between the access node and the UE.

37. The apparatus of claim 28, further comprising:
means for receiving information associated with the at least one cell configuration from a first network node based at least in part on a cell configuration procedure between the access node and the UE.

38. The apparatus of claim 28, further comprising:
means for receiving information associated with the at least one cell configuration from a first network node based at least in part on a connection establishment procedure between the access node and the UE.

39. The apparatus of claim 28, wherein the first cell is provided via a first Radio Access Technology (RAT) and the second cell is provided via a second RAT different from the first RAT.

40. The apparatus of claim 28, wherein the first cell is provided via a licensed radio frequency spectrum band and the second cell is provided via an unlicensed radio frequency spectrum band.

41. An apparatus for wireless communication at an access node in a wireless communications network, comprising:
 a processor;
 memory in electronic communication with the processor; and
 instructions stored in the memory, the instructions being executable by the processor to cause the apparatus to:
 provide a first cell associated with a first set of parameters;
 provide a second cell associated with a second set of parameters;
 identify, as part of an activation procedure or a modification procedure for at least one bearer associated with a user equipment (UE) served by the access node, at least one cell configuration for serving the UE over the first cell and the second cell, wherein the at least one cell configuration is based at least in part on the first set of parameters and the second set of parameters;
 select a service allocation of the at least one bearer, the service allocation comprising one or more service data flows over at least one of the first cell and the second cell based at least in part on the at least one cell configuration; and
 serve data traffic to the UE based at least in part on the selected service allocation.

42. The apparatus of claim 41, wherein the instructions are further executable by the processor to cause the apparatus to serve a first set of one or more service data flows over the first cell or serve a second set of one or more service data flows over the second cell.

43. The apparatus of claim 41, wherein the service allocation further comprises one or more of:
 a percentage of traffic volume to be served over the first cell and a percentage of traffic volume to be served over the second cell;
 a maximum amount of traffic volume to be served over the first cell or the second cell;
 a maximum bit rate to be served over the first cell or the second cell;
 a minimum bit rate to be served over the first cell or the second cell;
 an application type to be served over the first cell or the second cell;
 one or more bearers to be served over the first cell or the second cell, wherein the one or more bearers comprise at least the at least one bearer;
 one or more prioritization rules associated with the first cell or the second cell;
 a Quality of Service (QoS) requirement of traffic volume to be served by the first cell or the second cell; or
 an amount of air interface resources available to the first cell or the second cell.

44. The apparatus of claim 41, wherein the instructions are further executable by the processor to cause the apparatus to receive information associated with at least one cell configuration from a first network node based at least in part on:
 a default bearer activation or a default bearer modification procedure between the access node and the UE.

45. The apparatus of claim 44, wherein the instructions are further executable by the processor to cause the apparatus to receive information associated with the at least one cell configuration from a second network node.

46. The apparatus of claim 41, wherein the at least one cell configuration is provided:
 for the UE;
 for the at least one bearer of the UE;
 for the one or more service data flows (SDFs);
 for a class of UE; or
 for all UEs to be served using one or more of the first cell or the second cell.

47. The apparatus of claim 41, wherein the instructions are further executable by the processor to cause the apparatus to determine whether to serve the UE over the first cell and determine whether to serve the UE over the second cell.

48. The apparatus of claim 41, wherein the instructions are further executable by the processor to cause the apparatus to:
 receive information associated with the at least one cell configuration from a first network node based at least in part on a default bearer activation or a default bearer modification procedure between the access node and the UE.

49. The apparatus of claim 41, wherein the instructions are further executable by the processor to cause the apparatus to:
 receive information associated with the at least one cell configuration from a first network node based at least in part on a dedicated bearer activation or a dedicated bearer modification procedure between the access node and the UE.

50. The apparatus of claim 41, wherein the instructions are further executable by the processor to cause the apparatus to:
 receive information associated with the at least one cell configuration from a first network node based at least in part on a cell configuration procedure between the access node and the UE.

51. The apparatus of claim 41, wherein the instructions are further executable by the processor to cause the apparatus to:
 receive information associated with the at least one cell configuration from a first network node based at least in part on a connection establishment procedure between the access node and the UE.

52. The apparatus of claim 41, wherein the first cell is provided via a first Radio Access Technology (RAT) and the second cell is provided via a second RAT different from the first RAT.

53. The apparatus of claim 41, wherein the first cell is provided via a licensed radio frequency spectrum band and the second cell is provided via an unlicensed radio frequency spectrum band.

54. A non-transitory computer-readable medium storing computer-executable code for wireless communication at an access node in a wireless communications network, the code executable by a processor to:
 provide a first cell associated with a first set of parameters;
 provide a second cell associated with a second set of parameters;
 identify, as part of an activation procedure or a modification procedure for at least one bearer associated with a user equipment (UE) served by the access node, at least one cell configuration for serving the UE over the first cell and the second cell, wherein the at least one cell configuration is based at least in part on the first set of parameters and the second set of parameters;

select a service allocation of the at least one bearer, the service allocation comprising one or more service data flows over at least one of the first cell and the second cell based at least in part on the at least one cell configuration; and serve data traffic to the UE based at least in part on the selected service allocation.

55. The computer-readable medium of claim 54, wherein the code is further executable by the processor to serve a first subset of the one or more service data flows over the first cell or serve a second subset of one the or more service data flows over the second cell.

56. The computer-readable medium of claim 54, wherein the service allocation further comprises one or more of:
a percentage of traffic volume to be served over the first cell and a percentage of traffic volume to be served over the second cell;
a maximum amount of traffic volume to be served over the first cell or the second cell;
a maximum bit rate to be served over the first cell or the second cell;
a minimum bit rate to be served over the first cell or the second cell;
an application type to be served over the first cell or the second cell;
one or more bearers to be served over the first cell or the second cell, wherein the one or more bearers comprise at least the at least one bearer;
one or more prioritization rules associated with the first cell or the second cell;
a Quality of Service (QoS) requirement of traffic volume to be served by the first cell or the second cell; or
an amount of air interface resources available to the first cell or the second cell.

57. The computer-readable medium of claim 54, wherein the code is further executable by the processor to receive information associated with the at least one cell configuration from a first network node based at least in part on:
a default bearer activation or a default bearer modification procedure between the access node and the UE.

58. The computer-readable medium of claim 57, wherein the code is further executable by the processor to receive information associated with the at least one cell configuration from a second network node.

59. The computer-readable medium of claim 54, wherein the at least one cell configuration is provided:
for the UE;
for the at least one bearer of the UE;
for the one or more service data flows (SDFs);
for a class of UE; or
for all UEs to be served using one or more of the first cell or the second cell.

60. The computer-readable medium of claim 54, wherein the code is further executable by the processor to determine whether to serve the UE over the first cell and determine whether to serve the UE over the second cell.

61. The computer-readable medium of claim 54, wherein the code is further executable by the processor to:
receive information associated with the at least one cell configuration from a first network node based at least in part on a default bearer activation or a default bearer modification procedure between the access node and the UE.

62. The computer-readable medium of claim 54, wherein the code is further executable by the processor to:
receive information associated with the at least one cell configuration from a first network node based at least in part on a dedicated bearer activation or a dedicated modification procedure between the access node and the UE.

63. The computer-readable medium of claim 54, wherein the code is further executable by the processor to:
receive information associated with the at least one cell configuration from a first network node based at least in part on a cell configuration procedure between the access node and the UE.

64. The computer-readable medium of claim 54, wherein the code is further executable by the processor to:
receive information associated with the at least one cell configuration from a first network node based at least in part on a connection establishment procedure between the access node and the UE.

* * * * *